US011392889B1

(12) United States Patent
Degranville et al.

(10) Patent No.: US 11,392,889 B1
(45) Date of Patent: Jul. 19, 2022

(54) ANALYSIS OF EVENTS FOR STATE DETECTION

(71) Applicant: Amazon Technologies, Inc., Seattle, WA (US)

(72) Inventors: Charles Winn Degranville, Seattle, WA (US); Michael Dillon, Seattle, WA (US); Paul Aksenti Savastinuk, Bainbridge Island, WA (US); Joseph James Greene, Seattle, WA (US); Steven Xiang Chen, Seattle, WA (US); Christina Alexandra Polyukh, Seattle, WA (US); Michael L Sandige, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 132 days.

(21) Appl. No.: 16/584,268

(22) Filed: Sep. 26, 2019

(51) Int. Cl.
G06Q 10/08 (2012.01)
G06F 16/23 (2019.01)
(52) U.S. Cl.
CPC ....... *G06Q 10/087* (2013.01); *G06F 16/2365* (2019.01)
(58) Field of Classification Search
None
See application file for complete search history.

(56) References Cited

U.S. PATENT DOCUMENTS

| 9,117,106 | B2 | 8/2015 | Dedeoglu et al. |
| 9,235,928 | B2 | 1/2016 | Medioni et al. |
| 9,473,747 | B2 | 10/2016 | Kobres et al. |
| 10,127,438 | B1 | 11/2018 | Fisher et al. |
| 10,133,933 | B1 | 11/2018 | Fisher et al. |
| 2013/0284806 | A1 | 10/2013 | Margalit |
| 2019/0213212 | A1* | 7/2019 | Adato ............ G06F 16/55 |

* cited by examiner

*Primary Examiner* — Paul Danneman
(74) *Attorney, Agent, or Firm* — Lee & Hayes, P.C.

(57) ABSTRACT

Systems and techniques for detecting events involving users that occurred at an inventory location, and then using the events to determines states of the inventory location at various times. For instance, a system may generate event data representing first events that occur within an inventory location. The first events may include an associate performing a task, a customer removing an item, a customer returning an item, and/or so forth. The system may then use the event data to determine a state of the inventory location during a second event. In some examples, the state may include a tidy state or an untidy state. If the state includes a tidy state, then the system may generate a listing of items that includes at least one item associated with the second event. However, if the state includes an untidy state, then the system may further process the second event.

21 Claims, 10 Drawing Sheets

ANALYSIS OF EVENTS FOR STATE DETECTION

BACKGROUND

Retailers, wholesalers, and other product distributors typically maintain an inventory of various items that may be ordered, purchased, leased, borrowed, rented, viewed, and so forth, by clients or customers. For example, physical stores maintain inventory in customer accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
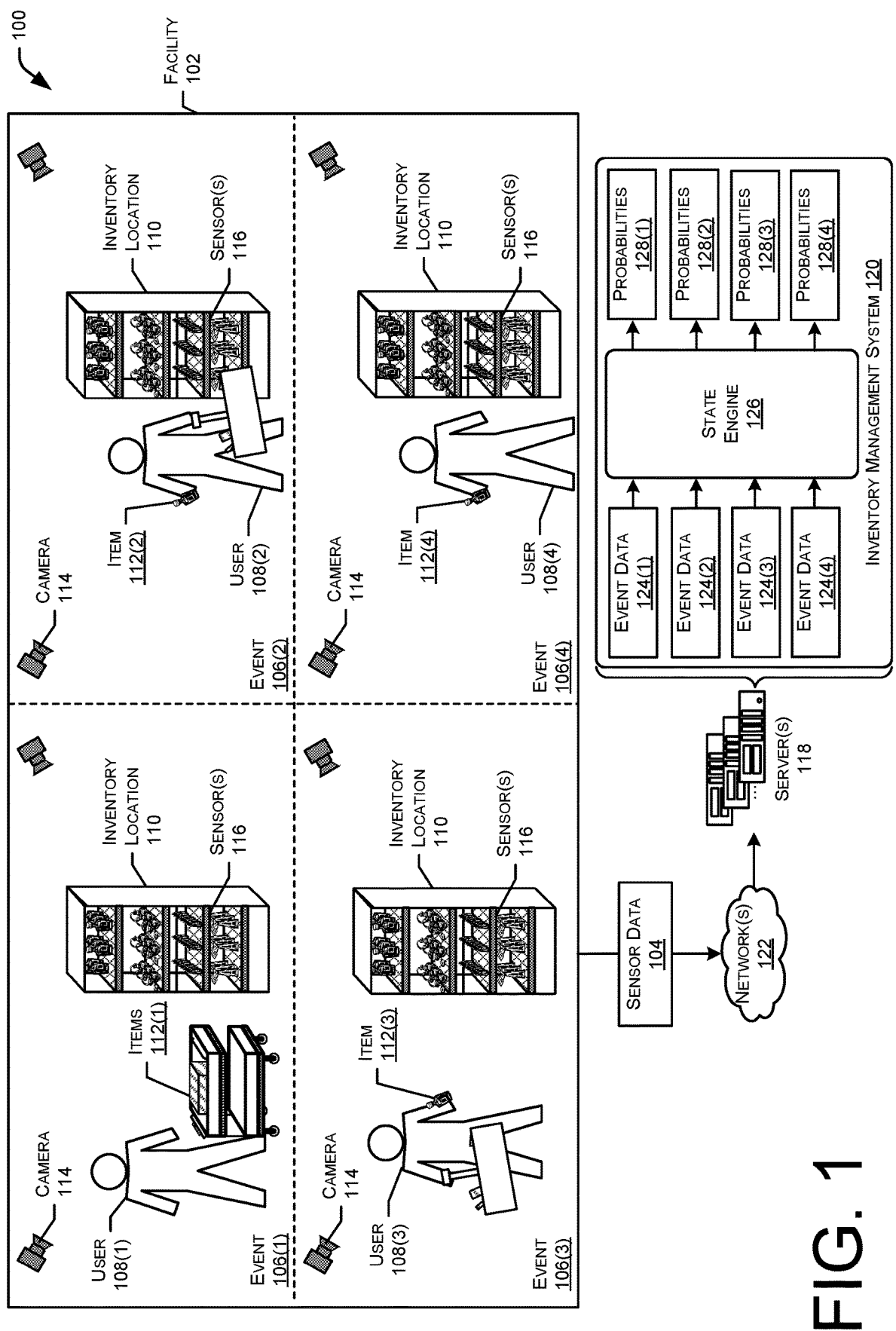
FIG. 1 illustrates an example environment of a materials handling facility that includes one or more sensors to generate sensor data for use in identifying one or more events that occur within the facility and then use the one or more events to determine one or more states of the material handling facility.

This disclosure describes systems and techniques for detecting events involving users that occur in a materials handling facility (or "facility"), and then determining states of the facility based on the events. The facility may include, or have access to, an inventory management system. The inventory management system may determine events that occur with an inventory location of the facility, such as an aisle, a shelf, a stand, a booth, a display, and/or other area of the facility that includes items. The inventory management system may then determine one or more features for respective events. Using the features for the events, the inventory management system may determine the state of the inventory location at various times. In some instances, the states may include a tidy state, an untidy state, and/or one or more other states. The inventory management system may then use the states when processing events for generating listings of items for the users.

As described herein, in some examples, a tidy state may indicate that item(s) located at the inventory location are associated with the inventory location and/or the item(s) are located within designated zone(s) for the item(s) within the inventory location. An untidy state may indicate that one or more of the item(s) located at the inventory are not associated with the inventory location and/or one or more of the item(s) are not located within designated zone(s) for the one or more item(s) within the inventory location.

For a first example, if the inventory location is associated with baseball equipment, then the inventory location may be in the tidy state when the items located at the inventory location include baseball equipment. Additionally, the inventory location may be in the untidy state when one or more items located at the inventory location include basketball equipment. For a second example, and again if the inventory location is associated with baseball equipment, the inventory location may be in the tidy state when first items, which include baseballs, are located within a first designated zone for baseball and second items, which include bats, are located in a second designated zone for bats. Additionally, the inventory location may be in the untidy state when at least one first item is located in the second designated zone.

As described herein, operation of the inventory management system may be supported by sensor data acquired by one or more sensors. The sensor data may include image data acquired by imaging devices such as cameras, weight sensors, information acquired from radio frequency tags, and/or so forth.

The inventory management system may determine, using the sensor data, occurrences of one or more "events" within the facility. Events may involve interactions between one or more items, inventory locations, users, totes, robots, changes in sensor operation, movement of objects, and/or so forth. For example, events may include, but are not limited to, a user (e.g., a customer) removing one or more items from an inventory location, a user (e.g., a customer) returning one or more items to an inventory location, an associate of the facility (e.g., an employee, a manager, etc.) performing a task associated with an inventory location, and/or so forth. When an associate performs a task, the task may include, but is not limited to, the associate restocking items located at the inventory location, the associate realigning items at the inventory location, the associate removing items that do not belong at the inventory location (e.g., misplaced items), and/or so forth.

The inventory management system may be configured generate and/or maintain information about events that occur at the inventory locations. For example, and for an inventory location, the inventory management system may maintain event data indicative of times that users removed items from an inventory location, times that users returned items to the inventory location, times that associates of the facility performed tasks associated with the inventory location, and/or so forth. In some instances, the event data may further indicate features associated with the events that occur at the inventory location. A feature associated with an event may include, but is not limited to, an identifier associated with the inventory location, a location of the inventory location within the facility, an identifier associated with an item removed from or returned to the inventory location, a number of items removed from or returned to the inventory location, a minimum quantity change for the item removed from or returned to the inventory location, a maximum quantity change for the item removed from or returned to the inventory location, an identifier associated with the user (e.g., associated, customer, etc.), a history of items removed or returned by the user, identifier(s) of item(s) located in a tote of the user, a time of day, week, month, and/or other period of time, a weight of the item removed from or returned to the inventory location, and/or so forth.

The inventory management system may then use one or more models to determine states of the inventory location at different times based on the events. The one or more models may comprise a convolutional neural network (CNN), a deep neural network, a random-forest model, and/or the like. The one or more models may output, for example, a numerical value indicating probabilities that the inventory location is in one or more states.

For example, the inventory management system may input the event data associated with the events into the one or more models. The inventory management system may then determine, using the one or more models, one or more probabilities associated with the inventory location. Using the one or more probabilities, the inventory management system may determine the states of the inventory location at given times. In some instances, the inventory management system may determine that the inventory location is in a first state when the probability satisfies (e.g., is equal to or greater than) a threshold and determine that the inventory location is in a second state when the probability does not satisfy (e.g., is less than) the threshold. In such instances, the first state may include a tidy state and the second state may include an untidy state. Additionally, the threshold may include, but is not limited to, 50%, 75%, 90%, 95%, and/or any other threshold.

The inventory management system may be configured to determine which events to use to determine a probability at a given point in time. In some instances, the inventory management system may use all events that occur after the inventory management system determines that the inventory location switches to a specific state (e.g., a tidy state) and/or determines that a probability exceeds a threshold (e.g., 100%, 98%, etc.). In some instances, the inventory management system may use all events that occur after the inventory management detects a specific event. For example, the inventory management system may use all event that occur after the inventory management system determines that an associate performed a task associated with the inventory location (which, in some instances, may place the inventory location in the tidy state). In some instances, the inventory management system may use all events that occur during a specific time period. For examples, the inventory management system may use all events that have occurred during the hour, the day, the week, and/or the like. Still, in some instances, the inventory management system may use a threshold number of preceding events. For example, the inventory management system may use the previous three events, five events, ten events, and/or the like.

In some instances, the one or more models may use the feature(s) associated with an event to determine the one or more probabilities for the state of the inventory location. For a first example, and if the inventory location is currently in a first state, the one or more models may use the feature(s) associated with an event to determine that there is a 97% probability that the inventory location is in the first state after the event and a 3% probability that the inventory location is in a second, different state after the event. For a second example, and again if the inventory location is currently in a first state, the one or more models may use the feature(s) associated with an event to determine that there is a 30% probability that the inventory location is in the first state after the event and a 70% probability that the inventory location is in a second, different state after the event. In other examples, where there is more than two states, the one or more models may determine a respective probability for each of the states.

Additionally, or alternatively, in some instances, the one or more models may use the feature(s) associated with an event to determine the one or more probabilities that the event causes the inventory location to "SWITCH" to a new state (e.g., from the first state to the second state, from the second state to the first state, etc.) and/or remain in the same state (e.g., stay in the first state, stay in the second state, etc.). For example, and again if the inventory location is in a first state before an event, the one or more models may use the feature(s) associated with an event to determine that there is a 3% probability the event caused the inventory location to switch from the first state to a second, different state, a 0% probability that the event caused the inventory location to switch from the second state to the first state, and a 97% probability that the event caused the inventory location to remain in the first state. In other words, the one or more models may determine both probabilities that the inventory location is currently in various states as well as probabilities that the inventory location switches between the various states.

When using the feature(s) to determine the one or more probabilities, the one or more models may provide more weight to one or more features. For example, the one or more models may provide a first weight to a first feature indicating the quantity of an item that was removed from the inventory location and a second, lower weight to a second feature indicating the time of day associated with the event. Additionally, when using the weights, the one or more models may use metrics data representing the weights for the various features. For example, the metrics data may include a first weight to use when the event data represents a first feature (e.g., the identifier associated with the inventory location), a second weight to use when the event data represents a second feature (e.g., the identifier associated with the item removed from the inventory location), a third weight to use when the event data represents a third feature (e.g., a number of items removed from the inventory location), and/or so forth.

Additionally, the metrics data may represent the various probabilities for different events. For a first example, the metrics data may indicate that when an event includes a customer removing an item, there is a first probability (e.g., 3%) that the event caused the inventory location to switch from the first state to the second state, a second probability (e.g., 0%) that the event caused the inventory location to switch from the second state to the first state, and a third probability (e.g., 97%) that the event caused the inventory location to remain in the first state and/or caused no state switch). For a second example, the metrics data may indicate that when an event includes a customer returning an item, there is a first probability (e.g., 10%) that the event caused the inventory location to switch from the first state to the second state, a second probability (e.g., 0%) that the event caused the inventory location to switch from the second state to the first state, and a third probability (e.g., 90%) that the event caused the inventory location to remain in the first state and/or caused no state switch). Still, for a third example, the metrics data may indicate that when an event includes an associate performing a task, there is a first probability (e.g., 0%) that the event caused the inventory location to switch from the first state to the second state, a second probability (e.g., 97%) that the event caused the inventory location to switch from the second state to the first state, and a third probability (e.g., 3%) that the event caused the inventory location to remain in the second state and/or caused no state switch).

The one or more models may then use the probabilities associated with the determined events to determine a probability at a given time. In some instances, the one or more models uses the probabilities by multiplying similar probabilities from the events. For instance, the one or more models may multiple each of the probabilities associated with the events causing the inventory location to switch from the first state to the second state. Additionally, or alternatively, the one or more models may multiply each of the probabilities associated with the events causing the inventory location to remain in a current state. While this is just one example of algorithms that may be used by the one or more models, in other examples, the one or more models may use additional and/or alternative algorithms.

For a first example, and when the inventory location is initially in the first state, the one or more models may determine to use three different events to determine a probability at a given time and as such, may input event data associated with the three events into the one or more models. The one or more models may determine that (1) for the first event, there is a 3% probability the first event caused the inventory location to switch from the first state to the second state, a 0% probability that the first event caused the inventory location to switch from the second state to the first state, and a 97% probability that the first event caused the inventory location to remain in the first state, (2) for the second event, there is a 5% probability the second event caused the inventory location to switch from the first state to the second state, a 0% probability that the second event caused the inventory location to switch from the second state to the first state, and a 95% probability that the first event caused the inventory location to remain in the first state, and (3) for a third event, there is a 10% probability the third event caused the inventory location to switch from the first state to the second state, a 0% probability that the third event caused the inventory location to switch from the second state to the first state, and a 90% probability that the first event caused the inventory location to remain in the first state.

In some instances, the one or more models may then determine the probabilities that the inventory location is in various states after the three events. For instance, the one or more models may determine that there is a 17% probability that the inventory location remained in the first state after the three events (e.g., 100%×97%×95%×90%) and an 83% probability that the inventory location is in the second state after the three events (100%-83%). As such, the inventory management system may determine that the inventory location is in the second state after the third event since the probability (17%) that the inventory location is in the first state does not satisfy a threshold probability (e.g., 90%).

Additionally, or alternatively, in some instances, the one or more models may determine that there is an 83% probability that the inventory location switched from the first state to the second state (e.g., 100%×97%×95%×90%), a 0% probability that the inventory location switched from the second state to the first state, and a 17% probability that the inventory location remained in the first state (100%-83%). Although these examples includes starting with a 100% probability that the inventory location was in the first state, in other examples, the one or more modules may start with less than a 100% probability that the inventory location was in the first state.

The inventory management system may use these determined states when generating a listing of items for sessions of users. Generally, a "session" of a user in the facility may include all the events that happen that might affect a listing of items of the user and occur from when the user, or group of users (e.g., a child with their parent), enter the facility to when the user exits the facility. For instance, the inventory management system may be automated to automatically identify the user when they enter the building (e.g., facial recognition, voice recognition, scanning of a user identifier on a phone or badge, etc.), identify the user when they exit the building, and identify locations and events involving the user that may affect the listing of items taken by the user.

The inventory management system may perform a session-based analysis of events involving the user after the user has finished their session in the facility. The inventory management system may receive event data for all of the events in the session of the user, and process the event data such that analysis for sessions of different users are decoupled from each other. The inventory management system may determine, for the session of the user, a finalize listing of the items taken by the user, as well as the quantity of the items taken, and may further store the listing of the items in an account of the user (e.g., a receipt to charge the user for the items taken).

The inventory management system may initially analyze the sensor data obtained or generated by sensors in the facility to generate initial event data that provides information indicative of the events in a session involving a user. For example, the inventory management system may process the sensor data to determine the occurrence of the events in the facility involving the user, and then generate the initial event data representing an initial hypothesis for a result of each respective event along with a confidence value indicating an estimation of accuracy of the hypothesis for each event (e.g., 90% confidence the result is accurate). Using these initial hypotheses for results of the events along with the confidence values, the inventory management may generate an initial probabilistic listing of the items determined to be taken by the user during the session.

In some instances, the inventory management system may this initial event data when determining the states of the inventory location at various times. This way the inventory management system can determine the states in real-time and/or as the events are occurring at the inventory location. Additionally, the inventory management system may later further process the sensor data and/or the initial event data using one or more additional processing techniques to confirm that the initial hypothesis for the results of each respective event, which is described in detail below. In other words, the inventory management system may further process the sensor data and/or the initial event data in order to increase the confidence values indicating the estimated accuracy of the hypothesis for each event. The inventory management system may then generate processed event data representing a final hypothesis for a result of each respective event along with a confidence value indicating an estimation of accuracy of the final hypothesis for each event (e.g., 90% confidence the result is accurate). In some instances, the confidence value indicating the final hypothesis may be equal to or greater than the confidence value indicating the initial hypothesis.

For examples of the inventory management system generating various types of event data, the inventory management system may generate event data indicating the initial hypothesis for the results of each respective event. In some instances, this event data may be referred to as initial event data. Additionally, the inventory management system may generate additional event data indicating the confirmed results for each respective event after the additional processing. In some instances, this event data may be referred to as refined event data. In some instances, and as described herein, a confidence level associated with the initial event data may be equal to or greater than a confidence level associated with the refined event data. This may be because the sensor data is further processed to generate the refined event data. In some instances, the inventory management system generates the refined event data after generating the initial event data.

The inventory management system may be configured to determine, for individual events, whether the inventory location associated with the event was in the first state (e.g., the tidy state) or the second state (e.g., the untidy state). To determine the state for an event, the inventory management system may perform the techniques described herein to determine the probability for the inventory location at a time of the event. In some instances, when determining the probability for the event, the inventory management system may use event data (e.g., the initial event data or the refined event data) representing one or more past events associated with the inventory location (as described above) and/or event data representing the current event. The inventory management system may then determine if the probability satisfies the threshold. If the inventory management system determines that the probability satisfies the threshold, then the inventory management system may determine that the inventory location was in the first state during the event. However, if the inventory management system determines that the probability does not satisfy the threshold, then the inventory management system may determine that the inventory location was in the second state during the event.

In some instances, based on determining that the inventory location was in the first state during the time of the event, the inventory management system may determine that the confidence level for the event satisfies a confidence threshold. As such, the inventory management system may determine to add an identifier for the item to the listing of items. However, based on determining that the inventory location was in the second state during the time of the event, the inventory management system may determine that the confidence level for the event does not satisfy the confidence threshold. As such, the inventory management system may determine that further processing needs to be performed before adding the identifier of the item to the listing of items.

For example, the inventory management system may select one or more algorithms to utilize to process the selected event further in order to generate the refined event data. In some examples, the one or more algorithms may be selected from a group of algorithms based on an expected information gain for executing the one or more algorithms being higher than expected information gains for executing the other algorithms to analyze the event. For example, the inventory management system may select a weight-based algorithm for the event, an image-based algorithm for the event, and/or the like. For example, the inventory management system may select an algorithm that analyzes weight data generated by a load cell in an inventory location associated with an item involved in the event to determine, with a higher confidence value, a result for the event that previously had a low confidence value.

After processing the event with the low confidence value with the selected one or more algorithms to determine a result with a higher confidence value, the inventory management system may add the identifier of the item to the listing of the items. Upon determining that a finalized probabilistic listing is acceptable with respect to uncertainty for the items and quantity of the items, the inventory management system may output the finalized probabilistic listing and close the session for the user that was being analyzed. The finalized probabilistic listing may, in some examples, be stored or associated with a user account. In examples where the session is a shopping session, a payment instrument of the user account may be charged for the cost of the items determined to be taken by the user during the session.

The techniques may be performed by one or more back-end devices or servers associated with the facility. For instance, the sensor data and/or image data may be collected by sensors in the facility and sent over network(s) to backend devices at the facility, or server devices located remote from the facility, to be processed remotely. Further, while various techniques described below are with reference to purchasing items in a retail facility, the techniques are generally applicable to any materials handling facility in which a user may take items from the facility or move items around the facility. For example, although the techniques described herein are primarily with reference to identifying items taken by a user for the purpose of identifying a user account to charge for items selected from a materials handling facility, the techniques are equally applicable to any industry in which user recognition may be helpful. For instance, the item-identifying tote may be implemented for distribution centers where employees collect items from various locations to be shipped through the mail system.

Although the techniques described herein are with reference to a session of a user in a materials handling facility, the techniques are generally applicable to any item-recognition environment. Other examples may include inventory-management systems automating the intake of new shipments of item inventory, libraries for processing returned books and/or identifying books obtained by a user during a library session, video-rental facilities for processing and sorting returned movies, and so forth.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 of a materials handling facility 102 (or "facility 102") that includes one or more sensors to generate sensor data 104 for use in identifying events 106(1)-(4) (or "events 106") that occur within the facility 102, and then use the events 106 to determine one or more states of the facility 102. The facility 102 may include one or more sensors to generate the sensor data 104 for use in identifying the events 106 that occur within the facility 102.

For instance, the first event 106(1), which may occur at a first time, may include a first user 108(1) (e.g., an associate of the facility 102) performing a task associated with an inventory location 110. For example, the first event 106(1) may include the first user 108(1) restocking the inventory location 110 with first items 112(1). The second event 106(2), which may occur at a second time, may include a second user 108(2) (e.g., a customer) removing a second item 112(2) from the inventory location 110. Additionally, the third event 106(3), which may occur at a third time, may include a third user 108(3) (e.g., a customer) returning a third item 112(3) to the inventory location 110. Finally, the fourth event 106(4), which may occur at a fourth time, may include a fourth user 108(4) (e.g., a customer) removing a fourth item 112(4) from the inventory location 110.

The facility 102 may be associated with an inventory management system that performs session-based analysis of the events 106 the for sessions of the users 108(1)-(4) (or "users 108") in the facility 102. In some examples, the inventory management system resides remotely from the facility 102 while in other instances, some or all of the inventory management system resides within or proximate to the facility 102.

The facility 102 may further have various sensors disposed within which track the movements of the users 108 and monitor the users 108 interactions with the items 112(1)-(4) (or "items 112") at the various inventory locations 110. For example, the facility 102 may include one or more cameras 114 (or other imaging sensors) to take images or videos as the users 108 move about the facility 102 and interact with items 112 in the facility 102. In some examples, the cameras 114 may continuously monitor respective regions of the facility 102. For instance, a set of cameras 114 may be assigned to record videos of a specific inventory location 110 from various angles and viewpoints. In some examples, the cameras 114 may take pictures of the users 108 and/or the items 112. For instance, as the users 108 enter and exit the facility 102, the cameras 114 may take pictures of the users 108. In some instances, cameras 114 may be placed on the inventory locations 110, such as in shelves of the inventory locations 110, and take pictures of items 112 or rows or items 112 at various points in time.

The sensors of the facility 102 may further include weight sensors 116 disposed in the inventory locations 110 to detect movement of the items 112. For example, each item 112 or row of items 112 may have associated weight sensors 116 configured to detect changes in weight, which may indicate an item 112 is being taken, returned, or otherwise moved. The weight sensors 116 may measure the weight and changes in weight to determine if items 112 are being interacted with, and time stamp the various measurements. In various examples, additional sensors may be disposed within the facility, such as radio frequency (RF) sensors, temperature sensors, humidity sensors, vibration sensors, and so forth, to take measurements in the facility 102.

The various sensors (e.g., cameras 114, weight sensors 116, etc.) may be configured to provide information suitable for locating the users 108, the items 112, or other objects in the facility 102. For example, the sensors may be used to identify what items 112 are removed and/or returned by which users 108 and placed in a shopping cart or other tote of the users 108.

Generally, the facility 102 may maintain listings of items 112 taken, or interacted with, by the users 108 as the users are in the facility 102. For instance, in an example where the facility 102 is an automated store, the facility 102 may determine what items 112 were taken by the users 108 when the users 108 leave the facility, and charge an account of the users 108 for the cost of the items 112. Thus, users 112 may engage in a session in the facility 102 where a session includes the events 106 that might affect the listings of items 112 potentially taken by the uses 108.

As illustrated, different users 108 may engage in sessions in the facility 102. For instance, the user 108(1) may engage in a first session, the second user 108(2) may engage in a second session, the third user 108(3) may engage in a third session, and/or the fourth user 108(4) may engage in a fourth session. As the users 108 move through the facility 102 and interact with items 112 and/or perform other actions or events 106, the sensors may generate the sensor data 104 that represents the actions and events 106 in which the users 108 are involved and time stamp the sensor data 102.

The facility 102 and sensors may include, or be communicatively coupled to, server(s) 118 that host or comprise an inventory management system 120. For example, the facility 102 and/or sensors may communicate with the inventory management system 120 using network(s) 122. The network(s) 122 may represent an array of wired networks, wireless networks (e.g., WiFi), or combinations thereof. The inventory management system 120 contains one or more modules configured to interact with users 108 or devices such as the sensors, robots, material handling equipment, computing devices, and so forth, in the facility 102. The inventory management system 120 may further include modules configured to receive the sensor data 104 and analyze the received sensor data 104 to identify the events 106 that occurred within the facility 102. For instance, the inventory management system 120 may detect the events 106 such as the user 108(1) performing the task associated with the inventory location 110 at the first time, the second user 108(2) removing the second item 112(2) from the inventory location 110 at the second time, the third user 108(3) returning the third item 112(3) to the inventory location 110 at the third time, the fourth user 108(4) removing the fourth item 112(4) from the inventory location 110, and/or so forth.

For example, the inventory management system 120 may have modules configured to perform facial recognition on the users 108 in video captured by the cameras 114 to determine the identifies of the users 108, and analyze data from the weight sensor(s) 116 to determine the items 112 were removed from the inventory location 110 or returned to the inventory location 110. Additionally, the modules may be configured to determine that the identified users 108 removed the items 112 or returned the items 112.

The inventory management system 120 may use one or more automated systems to generate the output data about the events 106. For example, neural networks, classifiers, or other automate computing techniques may be used to process the sensor data 104 and generate output data for the event 106. The automated systems may operate using probabilistic or non-probabilistic techniques. For example, the automated systems may use a Bayesian network. In another example, the automated systems may use support vector machines to generate the output data. The automated systems may generate confidence level data that provides information indicative of the accuracy or confidence that the output data corresponds to the physical world.

The output data about the events 106 may include event data 124(1)-(4) (or "event data 124"). For a first example, the event data 124(1) be associated with the event 106(1) and indicate that the event 106(1) includes the user 108(1) performing the task associated with the inventory location 110. The event data 124(1) may additionally and/or alternatively represent one or more features associated with the event 106(1). For example, the event data 124(1) may represent a first feature indicating the first time at which the event 106(1) occurred, a second feature indicating the identity of the user 108(1) (e.g., that the user 108(1) is an associate of the facility 102), a third feature indicating the identifier associated with the inventory location 110, and/or the like.

For a second example, the event data 124(2) be associated with the event 106(2) and indicate that the event 106(2) includes the user 108(2) removing the item 112(2) from the inventory location 110. The event data 124(2) may additionally and/or alternatively represent one or more features associated with the event 106(2). For example, the event data 124(2) may represent a first feature indicating the second time at which the event 106(2) occurred, a second feature indicating the identity of the user 108(2) (e.g., that the user 108(2) is a customer, an identifier associated with the user 108(2), etc.), a third feature indicating the identifier associated with the inventory location 110, and/or the like.

For a third example, the event data 124(3) be associated with the event 106(3) and indicate that the event 106(3) includes the user 108(3) returning the item 112(3) to the inventory location 110. The event data 124(3) may additionally and/or alternatively represent one or more features associated with the event 106(3). For example, the event data 124(3) may represent a first feature indicating the third time at which the event 106(3) occurred, a second feature indicating the identity of the user 108(3) (e.g., that the user 108(3) is a customer, an identifier associated with the user 108(3), etc.), a third feature indicating the identifier associated with the inventory location 110, and/or the like.

Finally, and for a fourth example, the event data 124(4) be associated with the event 106(4) and indicate that the event 106(4) includes the user 108(4) removing the item 112(4) from the inventory location 110. The event data 124(4) may additionally and/or alternatively represent one or more features associated with the event 106(4). For example, the event data 124(4) may represent a first feature indicating the fourth time at which the event 106(4) occurred, a second feature indicating the identity of the user 108(4) (e.g., that the user 108(4) is a customer, an identifier associated with the user 108(4), etc.), a third feature indicating the identifier associated with the inventory location 110, and/or the like.

In some instances, the event data 124 may be associated within initial hypothesis for the events 106. In such instances, the inventory management system 120 may, such as at a later time, further process the sensor data 104 to confirm the initial hypothesis for one or more of the events 106 and update the event data 124 accordingly. As such, and in some examples, a state engine 126 may use the event data 124 representing the initial hypothesis to determine probabilities 128(1)-(4) (also "probabilities 128") associated with the inventory location 110. In other examples, the state engine 126 may use the event data 124 representing the confirmed hypothesis to determine the probabilities 128 associated with the inventory location 110.

For example, the inventory management system 120 may include the state engine 126 that analyzes the event data 124 to determine states of the inventory location 110 at various times. In some instance, the state engine 126 uses one or more models to analyze the event data 124 in order to determine the probabilities 128 associated with the states of the inventory location 110.

For a first example, the state engine 126 may analyze the event data 124(1) to determine the probabilities 128(1) associated with the state of the inventory location 110 at the first time of the event 106(1) and/or after the first time of the event 106(1). In some examples, such as when the inventory location 110 is in the second state (e.g., the untidy state) right before the event 106(1), the state engine 126 may determine that the probabilities 128(1) include a first probability (e.g., 100%) that the inventory location 110 is in the first state after the event 106(1) a second probability (e.g., 0%) that the inventory location 110 is in the second state after the event 106(1). Additionally, or alternatively, the state engine 126 may determine the probabilities 128(1) to include a third probability (e.g., 0%) the event 106(1) caused the inventory location 110 to switch from the first state to the second state, a fourth probability (e.g., 100%) that the event 106(1) caused the inventory location 110 to switch from the second state to the first state (e.g., a tidy state), and a fifth probability (e.g., 0%) that the event 106(1) caused the inventory location 110 to remain in the second state.

In some instances, the state engine 126 may then use the probabilities 128(1) to determine the state of the inventory location 110 at the first time and/or after the first time. For instance, the state engine 126 may compare probabilities 128(1) to a threshold (e.g., 90%). Based on determining one of the probabilities 128(1) (e.g., the first probability) satisfies (e.g., is equal to or greater than) the threshold, the state engine 126 may determine that the inventory location 110 is in the first state.

For a second example, the state engine 126 may analyze the event data 124(2) to determine the probabilities 128(2) associated with the state of the inventory location 110 at the second time of the event 106(2) and/or after the second time of the event 106(2). In some examples, the state engine 126 may determine that the probabilities 128(2) include a first probability (e.g., 97%) that the inventory location 110 is in the first state after the event 106(2) and a second probability (e.g., 3%) that the inventory location 110 is in the second state after the event 106(2). Additionally, or alternatively, the state engine 126 may determine the probabilities 128(2) to include a third probability (e.g., 3%) the event 106(2) caused the inventory location 110 to switch from the first state to the second state, a fourth probability (e.g., 0%) that the event 106(2) caused the inventory location 110 to switch from the second state to the first state, and a fifth probability (e.g., 97%) that the event 106(2) caused the inventory location 110 to remain in the first state.

In some instances, the state engine 126 may then use the probabilities 128(2) to determine the state of the inventory location 110 at the second time and or after the second time. For instance, the state engine 126 may compare the probabilities 128(2) to the threshold (e.g., 90%). Based on determining that one of the probabilities 128(2) (e.g., the first probability) does not satisfy (e.g., is equal to or greater than) the threshold, the state engine 126 may determine that the inventory location 110 is in the first state.

For a third example, the state engine 126 may analyze the event data 124(2)-(3) to determine the probabilities 128(3) associated with the state of the inventory location 110 at the third time of the event 106(3) and/or after the third time of the event 106(3). In some examples, the state engine 126 may determine that the probabilities 128(3) include a first probability (e.g., 13%) that the inventory location 110 is in the first state after the event 106(3) and a second probability (e.g., 87%) that the inventory location 110 is in the second state after the event 106(3). Additionally, or alternatively, the state engine 126 may determine the probabilities 128(3) to include a third probability (e.g., 87%) the events 106(2)-(3) caused the inventory location 110 to switch from the first state to the second state, a fourth probability (e.g., 0%) that the events 106(2)-(3) caused the inventory location 110 to switch from the second state to the first state, and a fifth probability (e.g., 13%) that the events 106(2)-(3) caused the inventory location 110 to remain in the first state.

In some instances, the state engine 126 may then use the probabilities 128(3) to determine the state of the inventory location 110 at the third time and/or after the third time. For instance, the state engine 126 may compare the probabilities 128(3) to the threshold (e.g., 90%). Based on determining that one of the probabilities 128(3) (e.g., the first probability) does not satisfy (e.g., is below) the threshold, the state engine 126 may determine that the inventory location 110 is in the second state.

For a fourth example, the state engine 126 may analyze the event data 124(2)-(4) to determine the probabilities 128(4) associated with the state of the inventory location 110 at the fourth time of the event 106(4) and/or after the fourth time of the event 106(4). In some examples, the state engine 126 may determine that the probabilities 128(4) include a first probability (e.g., 10%) that the inventory location 110 is in the first state after the event 106(4) and a second probability (e.g., 90%) that the inventory location 110 is in the second state after the event 106(4). Additionally, or alternatively, the state engine 126 may determine that the probabilities 128(4) include a third probability (e.g., 90%) the events 106(2)-(4) caused the inventory location 110 to switch from the first state to the second state, a fourth probability (e.g., 0%) that the events 106(2)-(4) caused the inventory location 110 to switch from the second state to the first state, and a fifth probability (e.g., 10%) that the events 106(2)-(4) caused the inventory location 110 to remain in the first state.

In some instances, the state engine 126 may then use the probabilities 128(4) to determine the state of the inventory location 110 at the fourth time and/or after the fourth time. For instance, the state engine 126 may compare the probabilities 128(4) to the threshold (e.g., 90%). Based on determining that one of the probabilities 128(4) (e.g., the first probability) does not satisfy (e.g., is below) the threshold, the state engine 126 may determine that the inventory location 110 is in the second state.

In some instances, when determining the probabilities 128, the state engine 126 may use metrics data that represents the various probabilities for different individual events 106. For a first example, the metrics data may indicate that, for the event 106(2), there is a first probability (e.g., 3%) that the event 106(2) caused the inventory location 110 to switch from the first state to the second state, a second probability (e.g., 0%) that the event 106(2) caused the inventory location 110 to switch from the second state to the first state, and a third probability (e.g., 97%) that the event 106(2) caused the inventory location 110 to remain in the first state. For a second example, the metrics data may indicate that, for the event 106(3), there is a first probability (e.g., 86%) that the event 106(3) caused the inventory location 110 to switch from the first state to the second state, a second probability (e.g., 0%) that the event 106(3) caused the inventory location 110 to switch from the second state to the first state, and a third probability (e.g., 14%) that the event 106(3) caused the inventory location 110 to remain in the first state. Still, for a third example, the metrics data may indicate that, for the event 106(4), there is a first probability (e.g., 75%) that the event 106(4) caused the inventory location 110 to switch from the first state to the second state, a second probability (e.g., 0%) that the event 106(4) caused the inventory location 110 to switch from the second state to the first state, and a third probability (e.g., 25%) that the event 106(4) caused the inventory location 110 to remain in the first state.

In such instances, the state engine 126 may then use the individual probabilities to determine the final probabilities 128 for the events 124. For example, to determine the probabilities 128(4), the state engine 126 may multiple 100% (e.g., the probability that the inventory location 110 is in the first state after the event 106(1)) by the probabilities (e.g., 97%, 14%, and 75%) that the inventory location 110 remained in the first state based on each of the events 106(2)-(4). Based on the multiplication, the state engine 126 may determine that there is the 10% probability that the inventory location 110 is in the first state and/or remained in the first state after the events 106(2)-(4). Additionally, the state engine 126 may then determine the 90% probability that the inventory location 110 is in the second state and/or switched from the first state to the second state (e.g., 100%-10%). While this is just one example of determining the final probabilities 128, in other examples, the state engine 126 may use additional and/or alternative algorithms.

The inventor management system 120 may use the probabilities 128 to determine if confidence levels associated with the events 106 satisfies a confidence threshold. For example, the inventory management system 120 may use the probabilities 128 to determine if a confidence level associated with the event 106(2) satisfies the confidence threshold. In some instances, the inventory management system 120 uses the probabilities 128(1) before the event 106(2) to determine the state of the inventory location 110 at the second time of the event 106(2). In other instances, the inventory management system 120 uses the probabilities 128(2) that include the event data 124(2) to determine the state of the inventory location 110 at the second time of the event 106(2). In either instance, the inventory management system 120 may determine that the inventory location 110 is in the first state at the time of the event 106(2).

For another example, the inventory management system 120 may use the probabilities 128 to determine if a confidence level associated with the event 106(4) satisfies the confidence threshold. In some instances, the inventory management system 120 uses the probabilities 128(3) before the event 106(4) to determine the state of the inventory location 110 at the fourth time of the event 106(4). In other instances, the inventory management system 120 uses the probabilities 128(4) that include the event data 124(4) to determine the state of the inventory location 110 at the fourth time of the event 106(4). In either instance, the inventory management system 120 may determine that the inventory location 110 is in the second state at the time of the event 106(4).

Since the inventory management system 120 determines that the state of the inventory location 110 at the second time includes the first state, the inventory management system 120 may determine that the confidence level for the event 106(2) satisfies the confidence threshold. Additionally, the inventory management system 120 may generate the listing of items for the user 108(2) to include the second item 112(2). However, since the inventory management system 120 determines that the state of the inventory location 110 at the fourth time includes the second state, the inventory management system 120 may determine that the confidence level for the event 106(4) does not satisfy the confidence threshold. Therefore, the inventory management system 120 may determine that additional processing should be performed for the event 106(4).

Figure 2A:
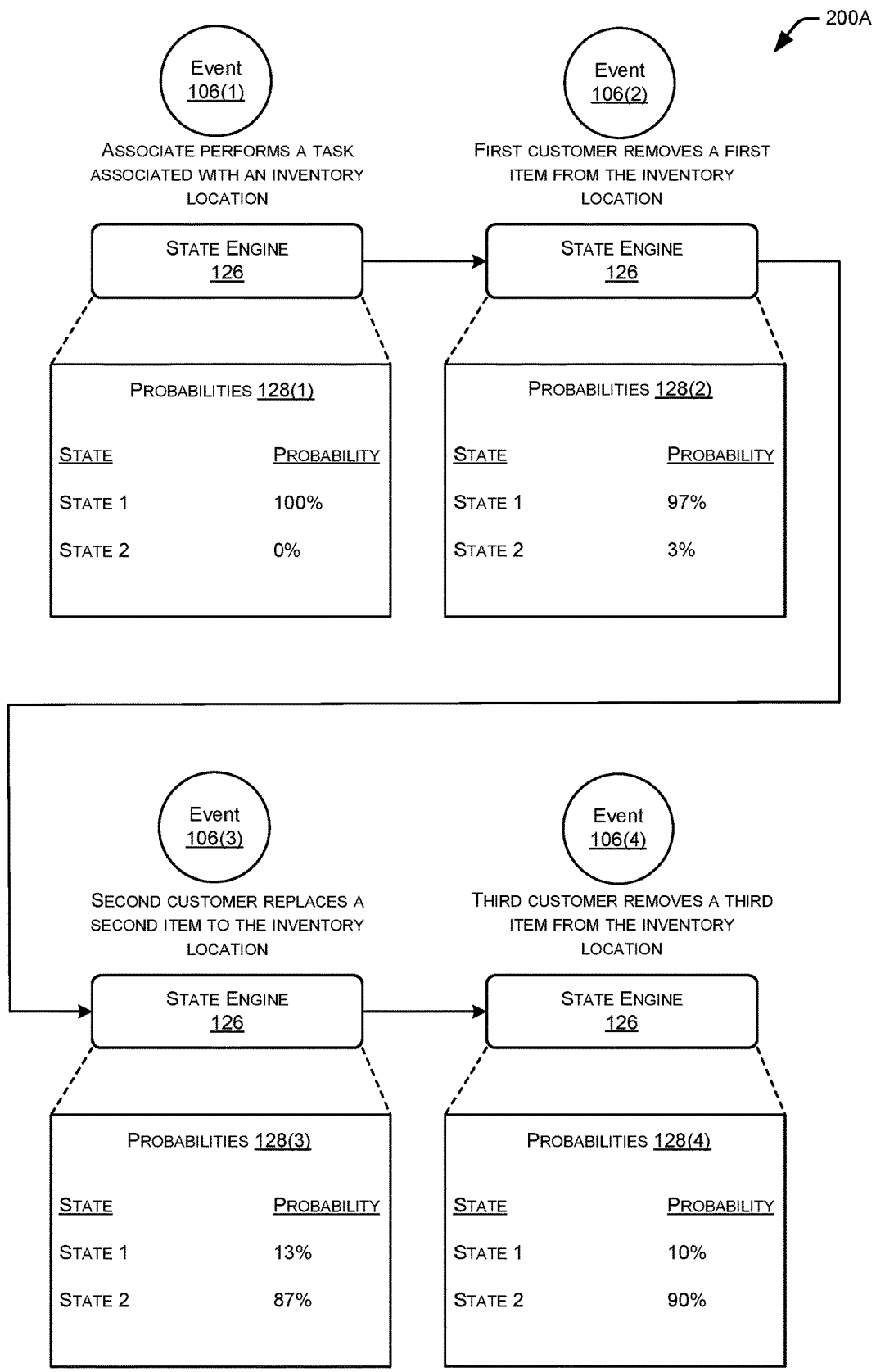
FIG. 2A illustrates a first example flow diagram of determining events at a material handling facility, and then using the events to determines states of the material handling facility.

FIG. 2A illustrates an example flow diagram 200A of determining the events 106 at the facility 102, and then using the events 106 to determines states of the facility 102. For instance, at a first time, the state engine 126 may receive the event data 124(1) associated with the event 106(1). In the example of FIG. 2, the event 106(1) includes an associate (e.g., the user 108(1)) performing a task associated with an inventory location (e.g., the inventory location 110). The state engine 126 may then analyze the event data 124(1) to determine the probabilities 128(1) associated with the inventory location 110 after the first time. As shown, the state engine 126 may determine that there is a 100% probability that the inventory location 110 is in the first state after the first time and a 0% probability that the inventory location 110 is in the second state after the first time.

Additionally, at a second time, the state engine 126 may receive the event data 124(1)-(2) associated with the events 106(1)-(2) (and/or just the event data 124(2) associated with the event 106(2)). In the example of FIG. 2, the event 106(2) includes a first customer (e.g., the user 108(2)) removing a first item (e.g., the item 112(2)) from the inventory location (e.g., the inventory location 110). The state engine 126 may then analyze the event data 124(1)-(2) (and/or just the event data 124(2)) to determine the probabilities 128(2) associated with the inventory location 110 at the second time. As shown, the state engine 126 may determine that there is a 97% probability that the inventory location 110 is in the first state after the second time and a 3% probability that the inventory location 110 is in the second state after the second time.

Furthermore, at a third time, the state engine 126 may receive the event data 124(1)-(3) associated with the events 106(1)-(3) (and/or just the event data 124(2)-(3) associated with the events 106((2)-(3)). In the example of FIG. 2, the event 106(3) includes a second customer (e.g., the user 108(3)) returning a second item (e.g., the item 112(3)) to the inventory location (e.g., the inventory location 110). The state engine 126 may then analyze the event data 124(1)-(3) (and/or just the event data 124(2)-(3)) to determine the probabilities 128(3) associated with the inventory location 110 at the third time. As shown, the state engine 126 may determine that there is a 13% probability that the inventory location 110 is in the first state after the third time and an 87% probability that the inventory location 110 is in the second state after the third time.

Moreover, at a fourth time, the state engine 126 may receive the event data 124(1)-(4) associated with the events 106(1)-(4) (and/or just the event data 124(2)-(4) associated with the events 106(2)-(4)). In the example of FIG. 2, the event 106(4) includes a third customer (e.g., the user 108(3)) removing a third item (e.g., the item 112(4)) from the inventory location (e.g., the inventory location 110). The state engine 126 may then analyze the event data 124(1)-(4) (and/or just the event data 124(2)-(4)) to determine the probabilities 128(4) associated with the inventory location 110 at the fourth time. As shown, the state engine 126 may determine that there is a 10% probability that the inventory location 110 is in the first state after the fourth time and a 90% probability that the inventory location 110 is in the second state after the fourth time.

The state engine 126 may use one or more algorithms to determine the states of the inventory location 110 using the probabilities 128. For a first example, the state engine 126 may compare the 100% probability that the inventory location 110 is in the first state after the first time to a threshold (e.g., 90%). Based on the 100% satisfying the threshold, the state engine 126 may determine that the inventory location 110 is in the first state after the first time of the event 106(1). For a second example, the state engine 126 may compare the 97% probability that the inventory location 110 is in the first state after the second time to the threshold. Based on the 97% satisfying the threshold, the state engine 126 may determine that the inventory location 110 is in the first state after the second time of the event 106(2).

For a third example, the state engine 126 may compare the 13% probability that the inventory location 110 is in the first state after the third time to the threshold. Based on the 13% not satisfying the threshold, the state engine 126 may determine that the inventory location 110 is in the second state after the third time of the event 106(3). Still, for a fourth example, the state engine 126 may compare the 10% probability that the inventory location 110 is in the first state after the fourth time to the threshold. Based on the 10% not satisfying the threshold, the state engine 126 may determine that the inventory location 110 is in the second state after the fourth time of the event 106(4).

Figure 2B:
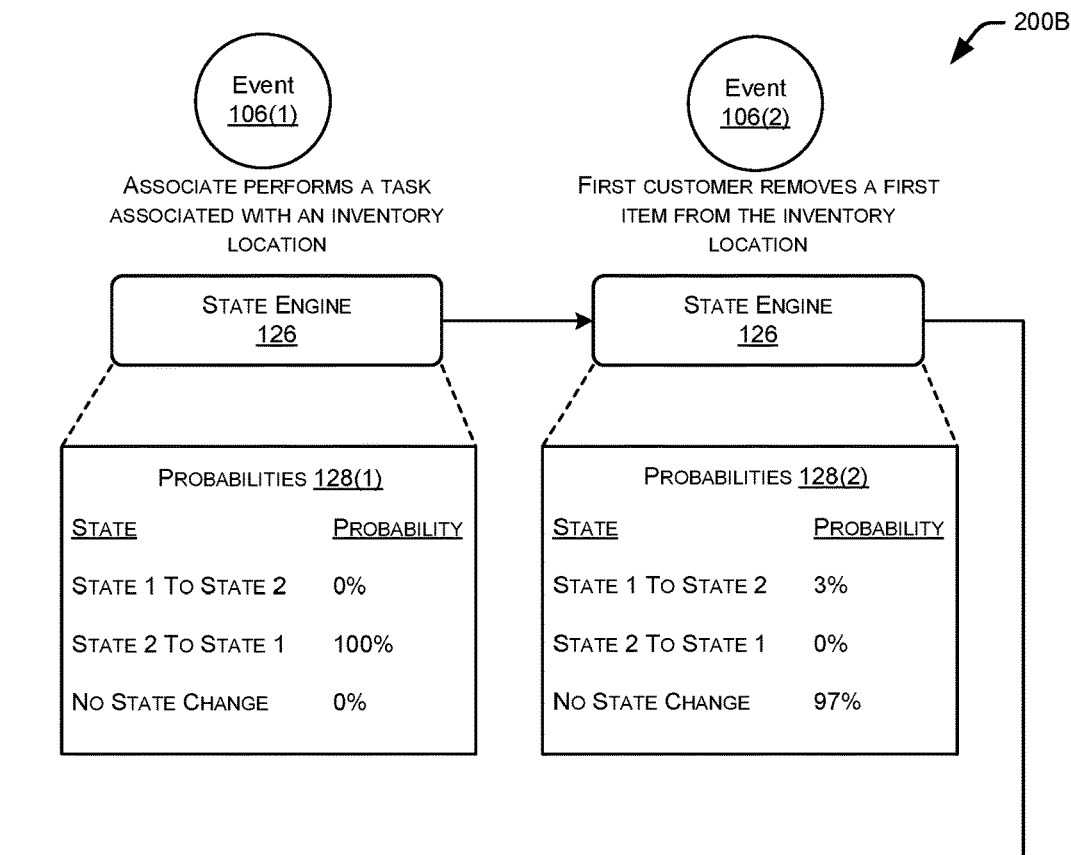
FIG. 2B illustrates a second example flow diagram of determining events at a material handling facility, and then using the events to determines states of the material handling facility.
Figure 2B:
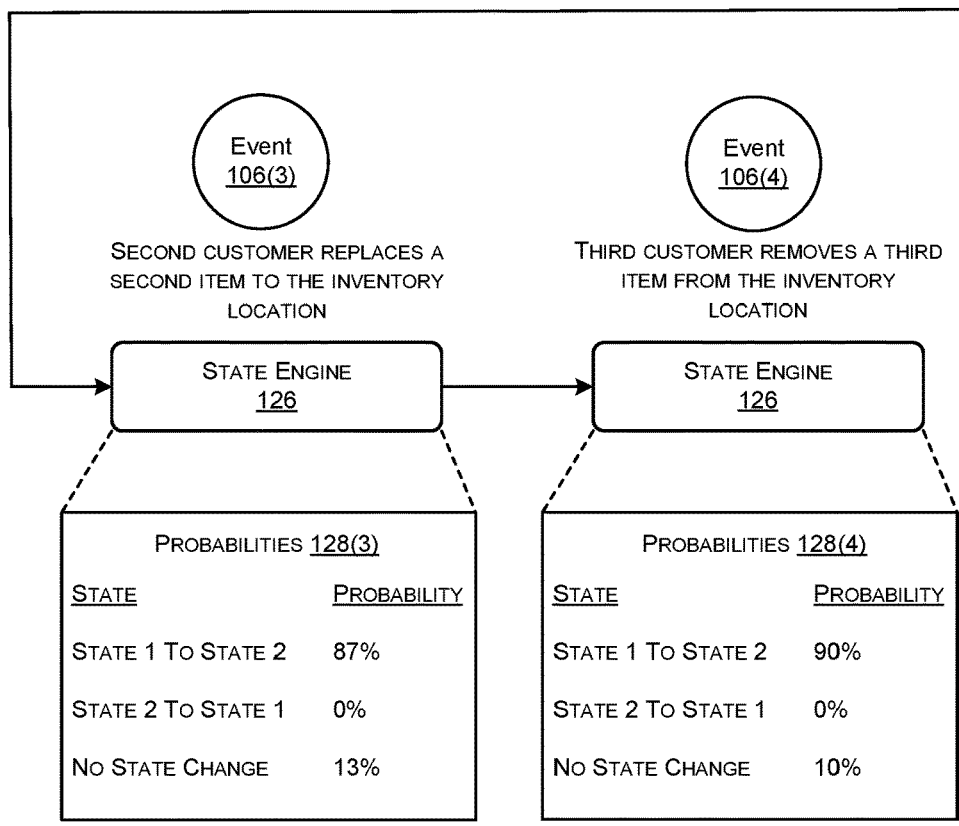

FIG. 2B illustrates another example flow diagram 200B of determining the events 106 at the facility 102, and then using the events 106 to determines states of the facility 102. For instance, at a first time, the state engine 126 may receive the event data 124(1) associated with the event 106(1). In the example of FIG. 2, the event 106(1) includes an associate (e.g., the user 108(1)) performing a task associated with an inventory location (e.g., the inventory location 110). The state engine 126 may then analyze the event data 124(1) to determine the probabilities 128(1) associated with the inventory location 110 at the first time. As shown, and assuming the inventory location 110 was in the second state before the event 106(1) occurred, the state engine 126 may determine that there is a 0% probability that the inventory location 110 switched from the first state to the second state, a 100% probability that the inventory location 110 switched from the second state to the first state, and a 0% probability that the inventory location 110 remained in the second state.

Additionally, at a second time, the state engine 126 may receive the event data 124(1)-(2) associated with the events 106(1)-(2) (and/or just the event data 124(2) associated with the event 106(2)). In the example of FIG. 2, the event 106(2) includes a first customer (e.g., the user 108(2)) removing a first item (e.g., the item 112(2)) from the inventory location (e.g., the inventory location 110). The state engine 126 may then analyze the event data 124(1)-(2) (and/or just the event data 124(2)) to determine the probabilities 128(2) associated with the inventory location 110 at the second time. As shown, the state engine 126 may determine that there is a 3% probability that the inventory location 110 switched from the first state to the second state, a 0% probability that the inventory location 110 switched from the second state to the first state, and a 97% probability that the inventory location 110 remained in the first state.

Furthermore, at a third time, the state engine 126 may receive the event data 124(1)-(3) associated with the events 106(1)-(3) (and/or just the event data 124(2)-(3) associated with the events 106((2)-(3)). In the example of FIG. 2, the event 106(3) includes a second customer (e.g., the user 108(3)) returning a second item (e.g., the item 112(3)) to the inventory location (e.g., the inventory location 110). The state engine 126 may then analyze the event data 124(1)-(3) (and/or just the event data 124(2)-(3)) to determine the probabilities 128(3) associated with the inventory location 110 at the third time. As shown, the state engine 126 may determine that there is an 87% probability that the inventory location 110 switched from the first state to the second state, a 0% probability that the inventory location 110 switched from the second state to the first state, and a 13% probability that the inventory location 110 remained in the first state.

Moreover, at a fourth time, the state engine 126 may receive the event data 124(1)-(4) associated with the events 106(1)-(4) (and/or just the event data 124(2)-(4) associated with the events 106(2)-(4)). In the example of FIG. 2, the event 106(4) includes a third customer (e.g., the user 108(3)) removing a third item (e.g., the item 112(4)) from the inventory location (e.g., the inventory location 110). The state engine 126 may then analyze the event data 124(1)-(4) (and/or just the event data 124(2)-(4)) to determine the probabilities 128(4) associated with the inventory location 110 at the fourth time. As shown, the state engine 126 may determine that there is a 90% probability that the inventory location 110 switched from the first state to the second state, a 0% probability that the inventory location 110 switched from the second state to the first state, and a 10% probability that the inventory location 110 remained in the first state.

The state engine 126 may use one or more algorithms to determine the states of the inventory location 110 using the probabilities 128. For a first example, the state engine 126 may compare the 0% probability that the inventory location 110 remained in the second state at the first time to a threshold (e.g., 90%). Based on the 0% not satisfying the threshold, the state engine 126 may determine that the inventory location 110 is in the first state at the first time of the event 106(1) and/or after the first time of the event 106(1). For a second example, and since the state engine 126 determined that the inventory location 110 switched to the first state at the first time, the state engine 126 may compare the 97% probability that the inventory location 110 remained in the first state at the second time to the threshold. Based on the 97% satisfying the threshold, the state engine 126 may determine that the inventory location 110 is in the first state at the second time of the event 106(2) and/or after the second time of the event 106(2).

For a third example, the state engine 126 may compare the 13% probability that the inventory location 110 remained in the first state at the third time to the threshold. Based on the 13% not satisfying the threshold, the state engine 126 may determine that the inventory location 110 is in the second state at the third time of the event 106(3) and/or after the third time of the event 106(3). Still, for a fourth example, the state engine 126 may compare the 10% probability that the inventory location 110 remained in the first state at the fourth time to the threshold. Based on the 10% not satisfying the threshold, the state engine 126 may determine that the inventory location 110 is in the second state at the fourth time of the event 106(4) and/or after the fourth time of the event 106(4).

Figure 3:
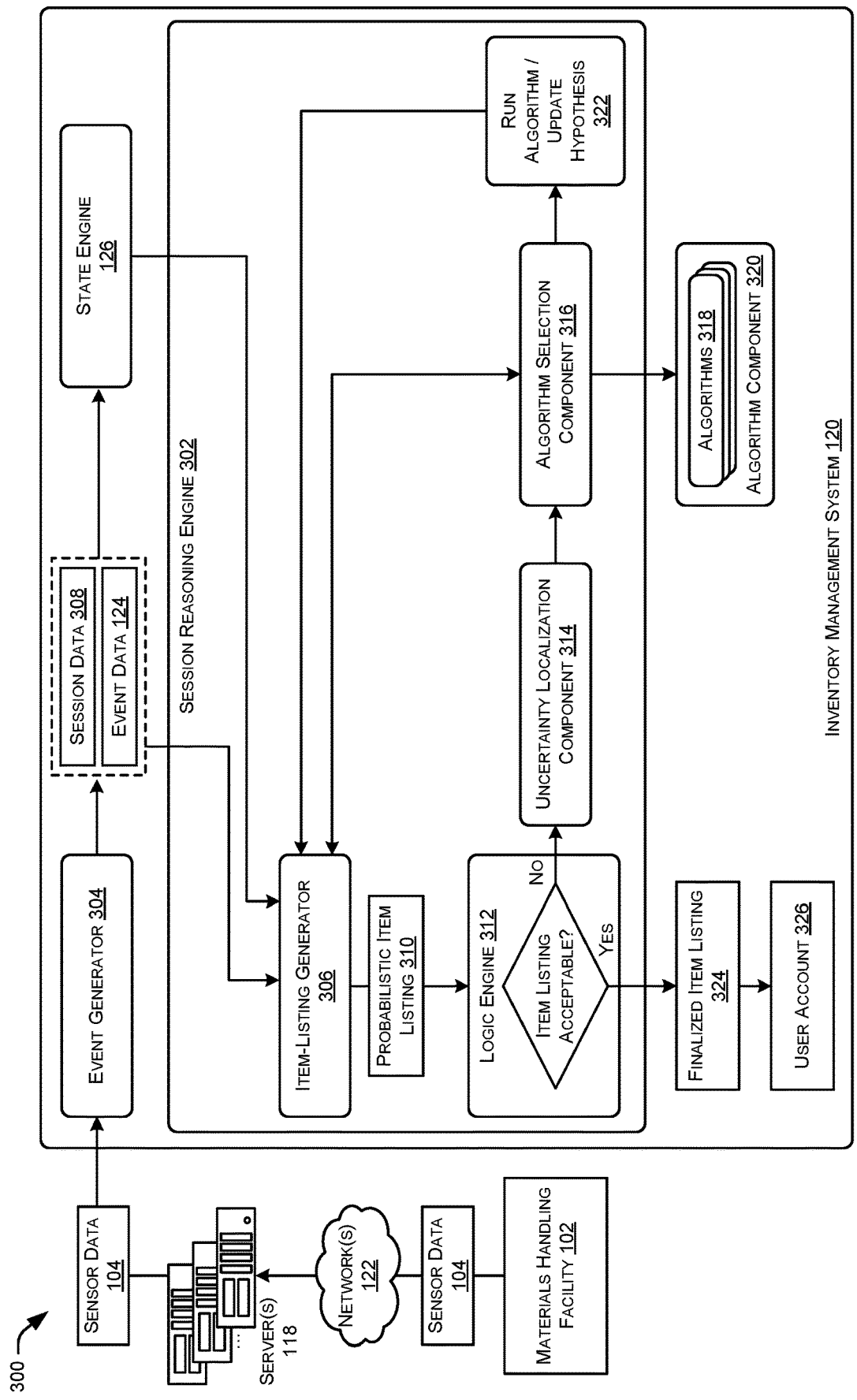
FIG. 3 is a block diagram of an example inventory management system that includes a session reasoning engine to iteratively resolve uncertainty in item listings of items taken from a material handling facility by a user.

FIG. 3 is a block diagram 300 of an example inventory management system that includes a session reasoning engine 302 to iteratively resolve uncertainty in item listings of items taken from a facility by a user.

An event generator 304 may initially analyze the sensor data 104 obtained or generated by sensors in the facility 102 to generate output data that provides information indicative of the events 106 in a session involving a user 108. For example, the event generator 304 may process the sensor data 104 to determine the occurrence of the events 106 in the facility 102 involving the user 108, and determine an initial hypothesis or multiple hypotheses for a result of each respective event 106 along with a confidence value indicating an estimation of accuracy of the hypothesis for each event (e.g., 90% confidence the result is accurate)

In some examples, the event generator 304 may include or utilize a hypothesis-accuracy-prediction (HAP) service. The HAP service may utilize a trained model, such as a neural network, a random-forest model, or any other type of model that has been trained to classify data. For example, the model may have been trained using supervised learning to determine a degree or measure of accuracy for hypotheses indicating different results of events 106. To train the model, the HAP system may have input data into the model along with corresponding ground-truth labels. For example, the HAP system may have obtained results of a large number of different events 106 based on respective sets of sensor data 104, and associated those events with known results.

The event generator 304 (e.g., HAP system) may use sensor data 104 to determine occurrence of an event 106, such as a user 108 picking an item 112 from a shelf in the facility 102. The event generator 304 may use this sensor data 104 to associate a result to an event record associated with this event 106, such as indication of an item identifier of the item 112 picked, a number of the total items picked, a user 108 that picked the item 112, etc. Further, the event generator 304 may calculate a confidence value associated with the determined result. For instance, the event generator 304 may extract feature data from the sensor data 104 associated with the event 106, and potentially feature data based on historical data, and may input this feature data into a trained model (or classifier). The model may comprise a convolutional neural network (CNN), a deep neural network, a random-forest model, and/or the like. The trained model may then output, for example, a numerical value indicating a likelihood that the hypothesis indicates a correct result for what occurred during the event 106. For example, the trained model may output a numerical value indicating a likelihood that one or more human associates would determine the same result as the hypothesis.

In some examples, the event generator 304 may determine multiple hypotheses indicating different results for an event 106, where each hypothesis has a different confidence value. The hypotheses may differ from each other in various ways, such as determining results for an event 106 that involve different items 112 being taken, different users 108 involved in the event 106, different numbers of items 112 being taken, different actions being taken (e.g., take of an item 112, return of an item 112, take/return of a foreign object, such as a user's 108 cell phone, etc.) In this way, the event generator 304 may generate multiple hypotheses indicating results for an event 106 with different confidence levels. The hypothesis may be included in the event data 124 such that each event 106 that occurred in the facility 102 during the session of the user 108 is associated with the session of that user 108, and is further associated with one or more hypotheses indicating potential results of the events 106. In some examples, the event data 124 may include data only for events 106 that were determined to involve a user 108 for the corresponding session, and in other examples, the event data 124 may include data for all events occurring in the facility 102 during the session of the user 108.

An item-listing generator 306 may receive session data 308 and event data 124 for sessions of users 108 and generate a probabilistic item listing 310. For instance, the item-listing generator 306 may use the hypotheses for results determined for each event 106, the confidence values for those hypotheses, and generate an initial probabilistic item listing 310 indicating quantities of the items 112 determined to be taken by the user 108 during the session.

To generate the probabilistic item listing 310, the item-listing generator 306 may utilize one or more algorithms that take the confidence values for the hypothesis of each event 106 and turn those into line items with associated probabilities for the probabilistic item listing 310. In some examples, the item-listing generator 306 may utilize historical event data from the facility 102 to help determine the probabilistic item listing 310. For example, the item-listing generator 306 may observe outputs from the event generator 304, and determine how often hypotheses for particular events 106 are correct versus incorrect. Using this observational data overtime, the item-listing generator 306 may determine probabilities that hypotheses for events 106 are correct.

The probabilistic item listing 310 may quantify uncertainty by including line-by-line indications of the items 112 determined to be taken (e.g., textual item identifiers) along with probabilities for quantities of the items 112 determined to be taken. For example, one of the lined items may be "apple/quantity 0 (0.3)/quantity 1 (0.5)/quantity 2 (0.2)" where the probabilities for the different quantities of the item "apple" all sum to "1."

In some examples, the item-listing generator 306 may intentionally insert uncertainty into the probabilistic item listing 310 to account for various event data 124. For example, the state engine 126 may determine the states of the inventory location 110 at various times of the events 106. In some instances, the states may include at least a first state, such as a tidy state, and a second state, such as an untidy state. The state engine 126 may then provide the states to the item-listing generator 306.

The item-listing generator 306 may determine that the probability associated with an item 112 that was taken or removed from the untidy location cannot be over the threshold probability. In this way, the item-listing generator 306 may ensure that an event 106 will be processed further to resolve any ambiguity caused by, for example, an untidy location or untidy interaction with an item 112. Stated otherwise, the item-listing generator 306 can force or cause the probabilistic item listing 310 to fail at a logic engine 312 and proceed to have events 106 processed further to account for potential uncertainties from the events 106 in the session.

The probabilistic item listing 310 may then be provided to the logic engine 312 which may analyze each line item and determine whether the probabilistic item listing 310 is acceptable, or if further processing of the events is needed to remove uncertainty in the probabilistic item listing 310 (e.g., if a probability score for an item is lower than some defined threshold). In some examples, the logic engine 312 may determine that one or more probabilities in the probabilistic item listing 310 are below an acceptable threshold (e.g., 0.8, 0.9, 0.999, etc.). Upon determining that at least one probability value is less than the threshold, the logic engine 312 may determine that the probabilistic item listing 310 is not acceptable to be finalized.

In some examples, the logic engine 312 may further utilized other metrics or parameters to determine whether a probabilistic item listing 310 is acceptable. In a store example, the logic engine 312 may determine that the line item with a probability value is less than a threshold is a product that has a low value. For example, the line item may indicate that the user 108 took a pack of gum, and there is a 50% probability that they took one pack of gum, and a 50% probability that they took two packs of gum. In such an example, because the price of a pack of gum is low, and because the amount of processing time and resources to resolve the uncertainty in the probabilistic item listing 310 is relatively high, the logic engine 312 may simply determine to just include the quantity of one on the probabilistic item listing 310 and potentially let the user 108 have a free pack of gum, rather than do further processing. As another example, the logic engine 312 may take into account the availability of processing resources available to the inventory management system 120. For example, if the inventory management system 120 is not processing many sessions, and that there is a high availability of resources for the inventory management system 120 to continue processing events 106 in the event data 124, the logic engine 312 may continue to determine that the probabilistic item listing 310 is not acceptable and continue to process the events 106 to iteratively reduce the uncertainty in the probabilistic item listing 310.

In some examples, the logic engine 312 may adjust the threshold associated with determining whether the probabilistic item listing 310 is acceptable based on one or more of the above metrics. For instance, in the pack of gum example where the line item is below a threshold price, the threshold may be lowered for the item listing of the pack of gum to be considered acceptable (e.g., dropped from 0.99 to 0.50). Conversely, if an item is expensive or costs more than a threshold (e.g., above $10, above $50, etc.), the threshold may be raised or maintained to determine acceptability of that line item (e.g., 0.99). Further, the availability of resources may be taken into account to raise or lower the threshold for acceptability of line items in the probabilistic item listing 310, such as raising the threshold if there is a high availability of resources for the inventory management system 120 to continue processing events in the session to resolve lower confidence events and raise the probabilities of the probabilistic item listings 310.

In examples where the logic engine 312 determines that the probabilistic item listing 310 is unacceptable due to uncertainty in an item 112 type and/or quantity of the item 112, an uncertainty localization component 314 may determine which event 106, from all the events 106 in the session with low confidence values, will provide the most information if processed further. For instance, the uncertainty localization component 314 may determine that a particular event 106 associated with the item with low probability values may be most advantageous to process further to determine a result with a higher confidence.

In some examples, the uncertainty localization component 314 may utilize one or more algorithms to perform a hypothetical analysis and determines, of all the events 106 in the session with low confidence, which event 106 would provide the most information to resolve uncertainty if processed further for a higher confidence value. For instance, the uncertainty localization component 210 may determine or speculate, for each event 106, an expected information gain for information that will increase the overall probability of the probabilistic item listing 310. The uncertainty localization component 314 may hypothetically resolve each event 106 according to the current set of hypotheses determined for each event 106, and look at the resulting probabilistic item listings 310 that would be generated from each of the resolve hypothetical scenarios to measure the entropy reduction for the resulting probabilistic item listings 310. In this way, the uncertainty localization component 314 may rank each of the events 106 in the session based on expected information gain from resolving the events to their hypotheses.

After the uncertainty localization component 314 determines an event 106 (e.g., top ranked event 106) from the session to process further to resolve uncertainty in the probabilistic item listing 310, an algorithm selection component 316 may select a particular algorithm 318 from the algorithm component 320 to utilize to process the selected event 106 further. In some examples, the algorithm 318 may be selected from a group of algorithms 318 based on an expected information gain for executing the algorithm 318 being higher than expected information gains for executing the other algorithms 318 to analyze the event 106. For example, if the event 106 was initially processed using a vision-based algorithm 318 where image data depicting the item 112 was processed to identify the item 112, the algorithm selection component 316 may select a weight-based algorithm 318 for the event 106. For instance, the algorithm selection component 316 may select an algorithm 318 that analyzes weight data generated by a load cell in an inventory location 110 associated with an item 112 involved in the event 106 to determine, with a higher confidence value, a result for the event 106 that previously had a low confidence value.

In some examples, the algorithms 318 may be ranked and/or selected based on expected information gain, and/or a "cost" associated with running the algorithms 318. For example, the algorithms 318 may require different amounts of time, computing resources, etc., to analyze events 106. For instance, an algorithm 318 that analyzes weight data to determine weights of items 112 may be a less costly algorithm 318 to run as compared to an algorithm 318 that performs more complex image processing of image data representing an event 106. Accordingly, the algorithm selection component 316 may select an algorithm 318 based on one or more of the expected information gain and various costs for running the algorithms 318. In some examples, particular algorithms 318 may be more optimized or appropriate for analyzing different event 106 types. For example, an algorithm for analyzing image data to determine which user 108, from among multiple users 108, interacted with an item 112 may be more appropriate than an algorithm 318 that analyzes weight data. For instance, an algorithm 318 may analyze image data to identify hands of the users 108 in the images, and determine which user's 108 hand was holding the item 112. As another example, an algorithm 318 that analyzes weight data may be optimized to determine what item 112, from multiple items 112, was placed on a shelf based on a weight comparison of weights known for the items 112 and the change in weight on the shelf.

In some examples, the algorithm selection component 316 may determine to process multiple events 106 in parallel using multiple algorithms 318. For instance, the algorithm selection component 316 may select a first algorithm 318 to analyze a first event 106 based on expected information gain and/or cost, and also select a second algorithm 318 to analyze a second event 106 at least partially at the same time.

After the algorithm selection component 316 has selected one or more algorithms 318 to run to process the event(s) 106, the algorithm selection component 316 may run the algorithm(s) 318 at 322 and update the hypotheses for each event 106. In some examples, at 322, the algorithm selection component 316 may determine which hypothesis from a group of hypotheses determined for the event 106 indicates the correct result. Stated otherwise, the algorithm 318 may be able to determine which hypothesis represents the correct result for the event 106 with more than a threshold confidence.

After processing, at 322, the event(s) 106 with the low confidence value with the selected algorithm(s) 318 to determine a result with a higher confidence value, the inventory management system 120 may re-compute the probabilistic item listing 310 using updated hypothesis and/or updated confidence values for the events 106 in the session. The logic engine 312 may then analyze each line item in the updated probabilistic item listing 310 and determine whether the probabilistic item listing 310 is acceptable after re-processing the event(s) 106, or if further processing of the events 106 is needed to remove uncertainty in the updated probabilistic item listing 310. The algorithm selection component 316 may iteratively process events 106 with low confidence values as described above until a final probabilistic listing of the items taken by the user is determined to be acceptable (e.g., probability values for each line item are greater than the threshold).

Upon determining that a finalized item listing 324 is acceptable with respect to uncertainty for the items and quantity of the items 112, the inventory management system 120 may output the finalized item listing 324 and close the session for the user 108 that was being analyzed. The finalized item listing 324 may, in some examples, be stored or associated with a user account 326. In examples where the session is a shopping session, a payment instrument of the user account 326 may be charged for the cost of the items 112 determined to be taken by the user 108 during the session.

Figure 4A:
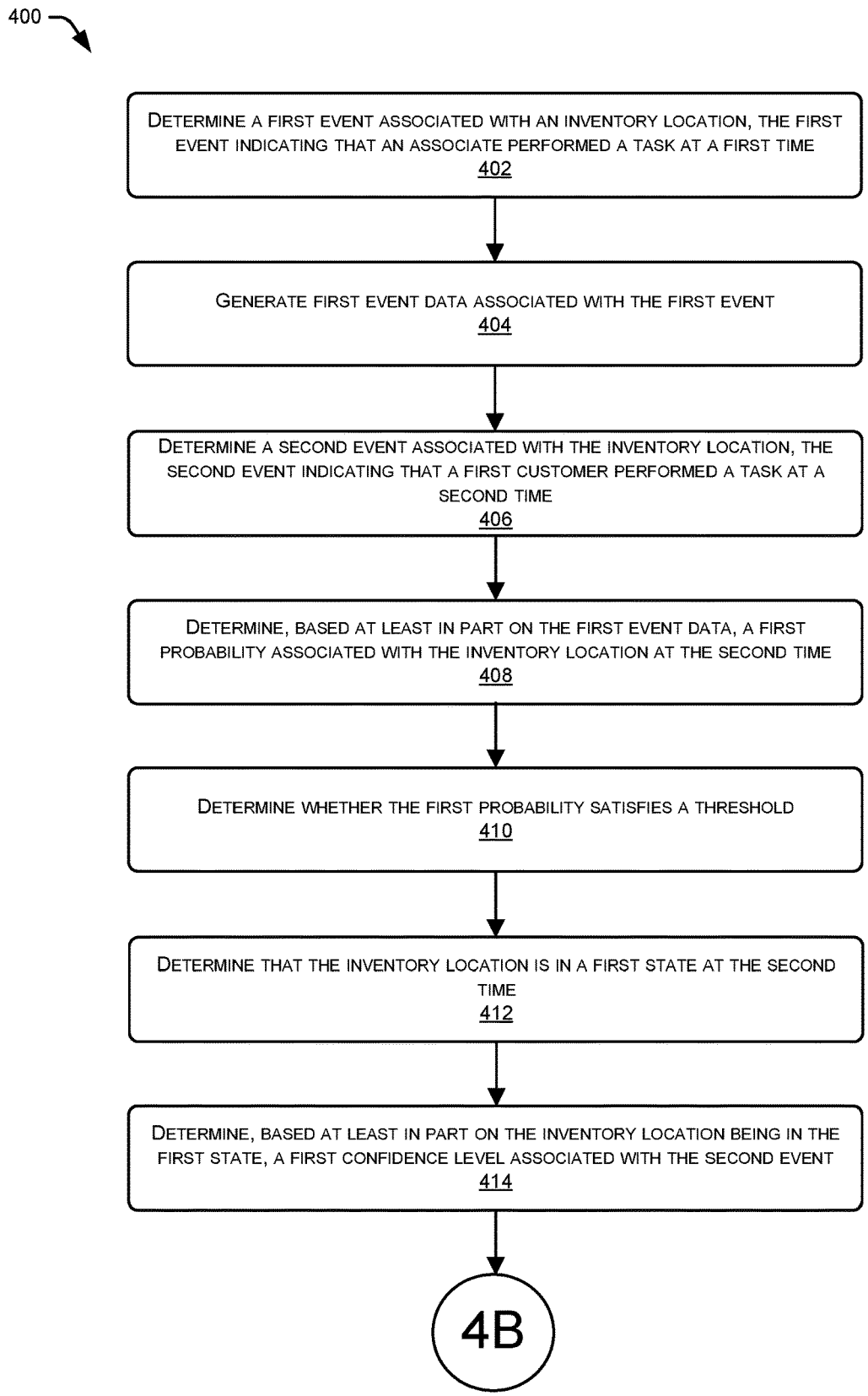
FIGS. 4A-4B illustrate a flow diagram of an example process for an inventory management system to analyze events associated with an inventory location in order to determine states of the inventory location over a period of time.
Figure 4B:
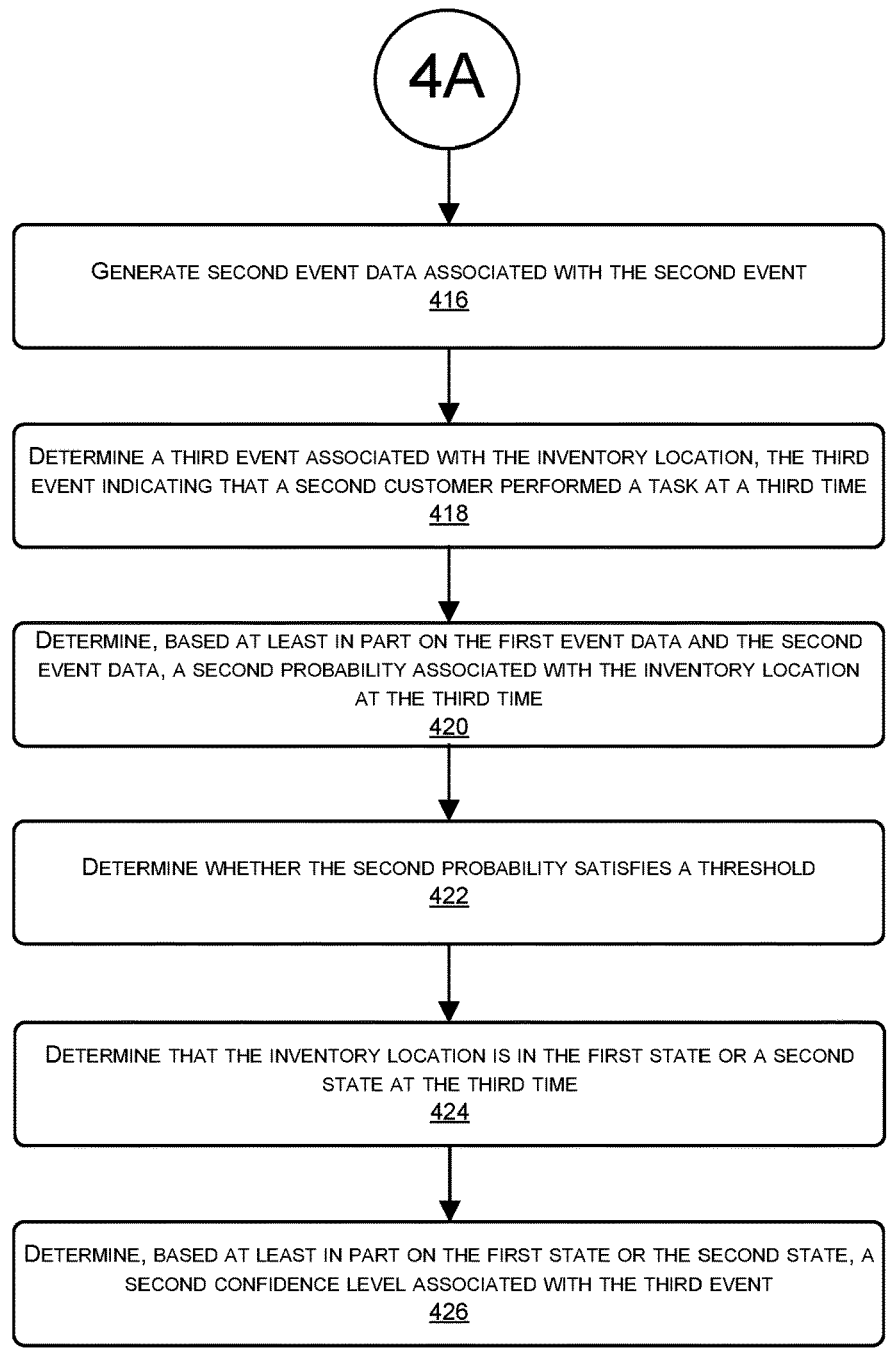
Figure 5:
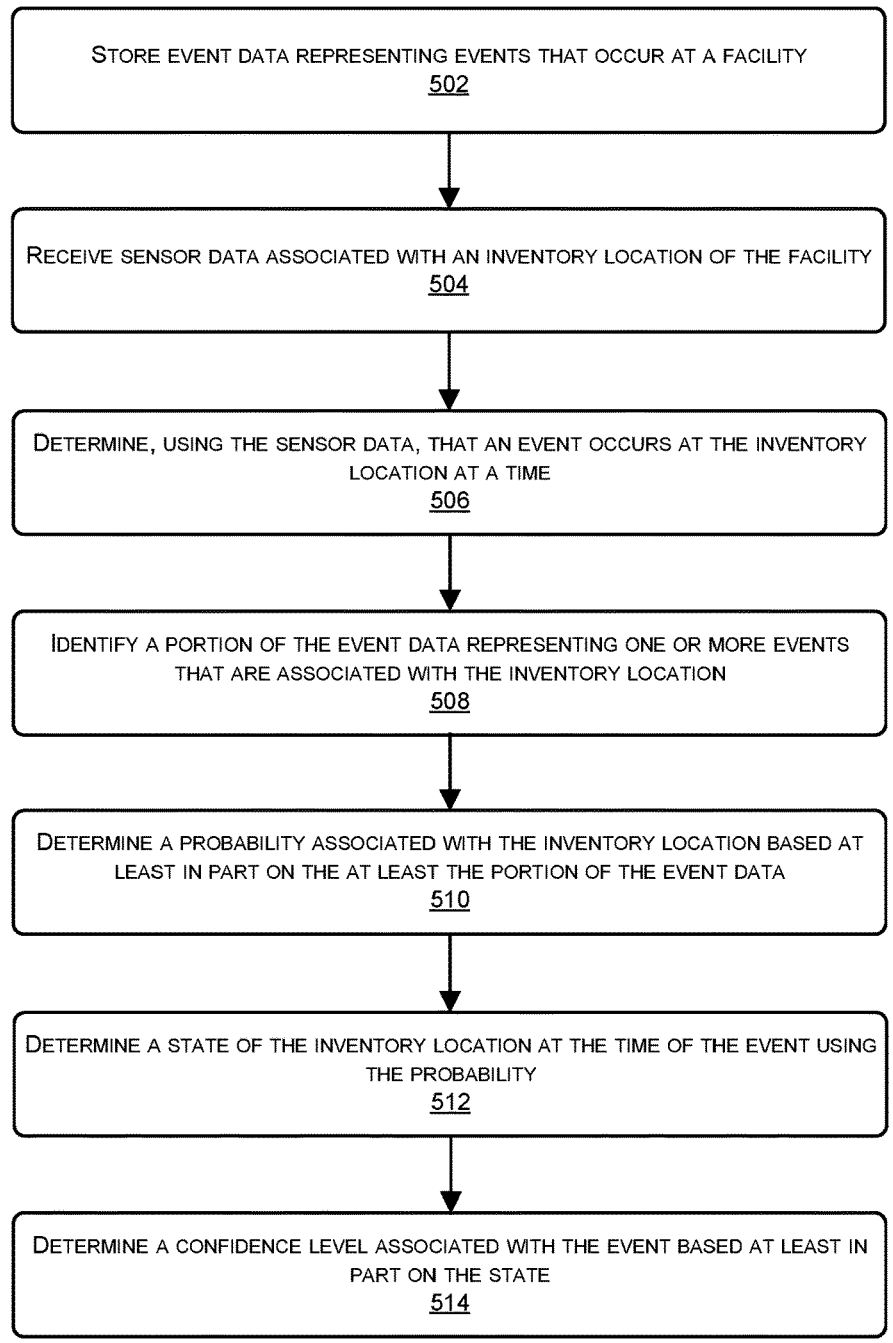
FIG. 5 illustrates a flow diagram of an example process for using event data to determine a state of an inventory location at a time of an event.

FIGS. 4A-5 illustrate various processes for determining states of an inventory location. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIGS. 4A-4B illustrate a flow diagram of an example process 400 for the inventory management system 120 to analyze events associated with an inventory location in order to determine states of the inventory location over a period of time. At 402, the process 400 ma include determining a first event associated with an inventory location, the first event indicating that an associate performed a task at a first time. For instance, the server(s) 118 may receive sensor data generated by one or more sensors located in a facility. The server(s) 118 may then analyze the sensor data to determine that the first event occurs at the inventory location within the facility. For instance, the server(s) 118 may analyze the sensor data to determine that the associate is performing the task, such as restocking items.

At 404, the process 400 may include generating first event data associated with the first event. For instance, the server(s) 118 may analyze the sensor data to determine one or more features associated with the first event. The server(s) 118 may then generate the first event data for the first event, where the first event data represents the one or more features.

At 406, the process 400 may include determining a second event associated with the inventory location, the second event indicating that a first customer performed a task at a second time. For instance, the server(s) 118 may analyze the sensor data to determine that the second event occurs at the inventory location. The second event may include the first customer removing item(s) from the inventory location, the first customer returning item(s) to the inventory location, and/or the like.

At 408, the process 400 may include determining, based at least in part on the first event data, a first probability associated with the inventory location at the second time. For instance, the server(s) 118 may analyze the first event data to determine the first probability. In some instances, to analyze the first event data, the server(s) 118 may use a table that associates various events and/or features of various events with probabilities for changing states of the inventory location. For instance, the server(s) may use the table to determine that, for events that include associates performing a task, there is a 100% probability that the inventory location remains in a first state (if the inventory location was already in the first state) and/or a 100% probability that the inventory location switches from a second state to the first state (if the inventory location was already in the second state). As such, the server(s) 118 may determine that the first probability includes a 100% probability that the inventory location is in the first state and/or a 100% probability that the inventory location changed from the second state to the first state.

In some instances, the server(s) 118 may further generate second event data associated with the second event. The server(s) 118 may then further determine the first probability based on the second event data.

At 410, the process 400 may include determining whether the first probability satisfies a threshold and at 412, the process 400 may include determining that the inventory location is in a first state at the second time. For instance, the server(s) 118 may compare the first probability to the threshold to determine if the first probability satisfies the threshold. Based on the comparison, the server(s) 118 may further determine that the inventory location is in the first state at the second time. For example, if the first probability satisfies the threshold, then the server(s) 118 may determine that the inventory location is in a tidy state. However, if the first probability does not satisfy the threshold, then the server(s) 118 may determine that the inventory location is in an untidy state.

At 414, the process 400 may include determining, based at least in part on the inventory location being in the first state, a first confidence level associated with the second event. For instance, the server(s) 118 may use the first state of the inventory location to determine the first confidence level associated with the second event. For example, if the server(s) 118 determine that the inventory location is in the tidy state, then the server(s) 118 may determine that the first confidence level is high and/or satisfies a threshold confidence level. As such, and in some examples, the server(s) 118 may add identifier(s) associated with item(s) removed from the inventory location to a listing of items for the first customer. However, if the server(s) 118 determine that the inventory location is in the untidy state, then the server(s) 118 may determine that the confidence level is low and/or does not satisfy the threshold confidence level. As such, and in some examples, the server(s) 118 may determine to perform additional processing for the second event.

At 416, the process 400 may include generating second event data associated with the second event. For instance, the server(s) 118 may analyze the sensor data to determine one or more features associated with the second event. The server(s) 118 may then generate the second event data for the second event, where the second event data represents the one or more features.

At 418, the process 400 may include determining a third event associated with the inventory location, the third event indicating that a second customer performed a task at a third time. For instance, the server(s) 118 may analyze the sensor data to determine that the third event occurs at the inventory location. The third event may include the second customer removing item(s) from the inventory location, the second customer returning item(s) to the inventory location, and/or the like.

At 420, the process 400 may include determining, based at least in part on the first event data and the second event data, a second probability associated with the inventory location at the third time. For instance, the server(s) 118 may analyze the first event data and the second event data to determine the second probability. In some instances, to analyze the first event data and/or the second event data, the server(s) 118 may use the table that associates various events and/or features of various events with probabilities for changing states of the inventory location. For example, the server(s) may use the table to determine that, for events that include associates performing a task, there is a 100% probability that the inventory location remains in a first state (if the inventory location was already in the first state) and/or a 100% probability that the inventory location switches from a second state to the first state (if the inventory location was already in the second state). Additionally, the server(s) may determine that, for events that include customers removing item(s) from an inventory location, there is a 97% probability that the inventory location remains in the first state. As such, the server(s) 118 may determine that the second probability includes a 97% probability that the inventory location is in the first state, a 3% probability that the inventory location is in the second state, and/or a 3% probability that the inventory location switches from the first state to the second state.

In some instances, the server(s) 118 may further generate third event data associated with the third event. The server(s) 118 may then further determine the second probability based on the third event data.

At 422, the process 400 may include determining whether the second probability satisfies the threshold and at 424, the process 400 may include determining that the inventory location is in the first state or a second state at the third time. For instance, the server(s) 118 may compare the second probability to the threshold to determine if the second probability satisfies the threshold. Based on the comparison, the server(s) 118 may further determine that the inventory location is in the first state or the second state at the third time. For example, if the second probability satisfies the threshold, then the server(s) 118 may determine that the inventory location is in the tidy state. However, if the second probability does not satisfy the threshold, then the server(s) 118 may determine that the inventory location is in the untidy state.

At 426, the process 400 may include determining, based at least in part on the inventory location being in the first state or the second state, a second confidence level associated with the third event. For instance, the server(s) 118 may use the first state or the second state of the inventory location to determine the second confidence level associated with the second event. For example, if the server(s) 118 determine that the inventory location is in the tidy state, then the server(s) 118 may determine that the second confidence level is high and/or satisfies the threshold confidence level. As such, and in some examples, the server(s) 118 may add identifier(s) associated with item(s) removed from the inventory location to a listing of items for the second customer. However, if the server(s) 118 determine that the inventory location is in the untidy state, then the server(s) 118 may determine that the second confidence level is low and/or does not satisfy the threshold confidence level. As such, and in some examples, the server(s) 118 may determine to perform additional processing for the third event.

FIG. 5 illustrates a flow diagram of an example process 500 for using event data to determine a state of an inventory location at a time of an event. At 502, the process 500 may include storing event data representing events that occur at a facility. For instance, the server(s) 118 may generate and then store the event data. The event data may represent the events, where the events occur at various inventory locations of the facility. For instance, the events may occur at various aisles, shelves, stands, booths, displays, and/or other areas of the facility. In some instances, the event data may represent events that occur in a given period of time, such as hour, day, week, month, year, and/or other period of time.

At 504, the process 500 may include receiving sensor data associated with an inventory location of the facility and at 506, the process 500 may include determining, using the sensor data, that an event occurs at the inventory location at a time. For instance, the server(s) 118 may receive the sensor data generated by the sensors. The server(s) 118 may then analyze the sensor data to determine that the event occurs at the inventory location. In some instances, the event may be associated with a user (e.g., an associate, a customer, etc.). For example, the event may include, but is not limited to, the user removing item(s) from the inventory location, the user returning item(s) to the inventory location, and/or the like.

At 508, the process 500 may include identifying a portion of the event data representing one or more events that are associated with the inventory location. For instance, the server(s) 118 may determine which of the events to use to determine a state of the inventory location at the time of the event. In some instances, the server(s) 118 may use all events that occur after the server(s) 118 determines that the inventory location switches to a specific state (e.g., a tidy state). In some instances, the server(s) 118 may use all events that occur after the server(s) 118 detect a specific event, such as an associate performed a task associated with the inventory location. In some instances, the server(s) 118 may use all events that occur during a specific time period. Still, in some instances, the server(s) 118 may use a threshold number of preceding events.

At 510, the process 500 may include determining a probability associated with the inventory location based at least in part on the at least the portion of the event data. For instance, the server(s) 118 may use one or more models to analyze the at least the portion of the event data. Based on the analysis, the server(s) 118 may determine the probability. In some instances, the probability may indicate a likelihood that the inventory location is in a given state at the time of the event.

At 512, the process 500 may include determining a state of the inventory location at the time of the event using the probability. For instance, the server(s) 118 may determine if the probability satisfies a threshold. If the server(s) 118 determine that the probability satisfies the threshold, then the server(s) 118 may determine that the inventory location is in a first state, such as a tidy state, at the time of the event. However, if the server(s) 118 determine that the probability does not satisfy the threshold, then the server(s) 118 may determine that the inventory location is in a second state, such as an untidy state, at the time of the event.

At 514, the process 500 may include determining a confidence level associated with the event based at least in part on the state. For instance, the server(s) 118 may use the state of the inventory location to determine the confidence level associated with the event. For example, if the server(s) 118 determine that the inventory location is in the first state, then the server(s) 118 may determine that the confidence level is high and/or satisfies a threshold confidence level. As such, and in some examples, the server(s) 118 may add identifier(s) associated with the item(s) removed from the inventory location to a listing of items. However, if the server(s) 118 determine that the inventory location is in the second state, then the server(s) 118 may determine that the confidence level is low and/or does not satisfy the threshold confidence level. As such, and in some examples, the server(s) 118 may determine to perform additional processing for the event.

Figure 6:
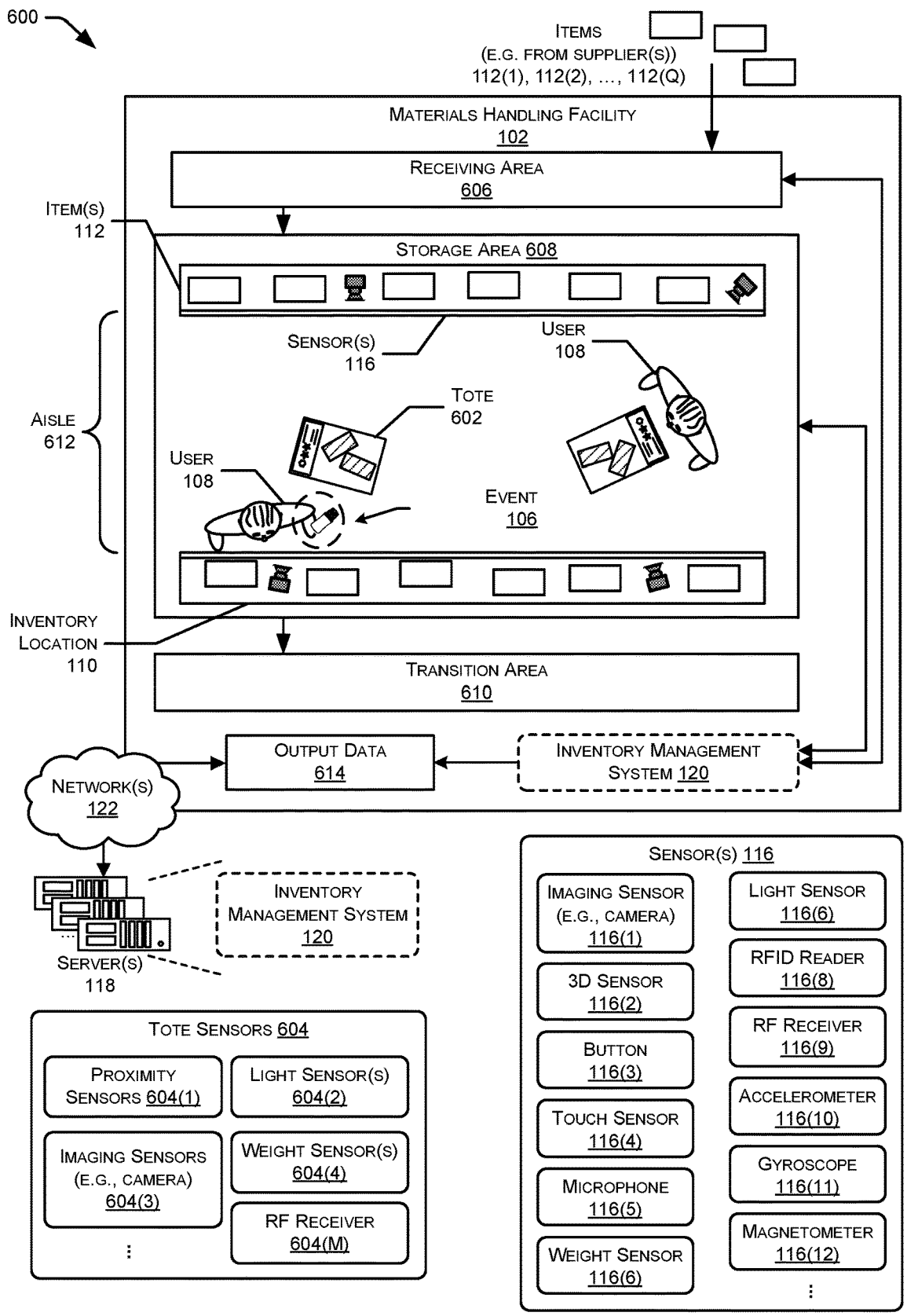
FIG. 6 is a block diagram of a materials handling facility that includes sensors and an inventory management system configured to generate output regarding events occurring in the materials handling facility using the sensor data. The events may include, for example, a user picking an item or returning an item. The material handling facility and/or a tote may include example sensors that may be utilized to generate sensor data to detect the events.

FIG. 6 is a block diagram of the facility 102 that includes sensors 116 and an inventory management system 120 configured to generate output regarding events 106 occurring in the facility using the sensor data. The events 106 may include, for example, a user 108 picking an item 112 or returning an item 112. The facility 102 and/or a tote 602 may include example sensors 604 that may be utilized to generate sensor data to detect the events 106. However, the following description is merely one illustrative example of an industry and environment in which the techniques described herein may be utilized.

The facility 102 comprises one or more physical structures or areas within which one or more items 112(1), 112(2), . . . , 112(Q) (generally denoted as 112) may be held. As used in this disclosure, letters in parenthesis such as "(Q)" indicate an integer result. The items 112 comprise physical goods, such as books, pharmaceuticals, repair parts, electronic gear, groceries, and so forth.

The facility 102 may include one or more areas designated for different functions with regard to inventory handling. In this illustration, the facility 102 includes a receiving area 606, a storage area 608, and a transition area 610. The receiving area 606 may be configured to accept items 112, such as from suppliers, for intake into the facility 102. For example, the receiving area 606 may include a loading dock at which trucks or other freight conveyances unload the items 112.

The storage area 608 is configured to store the items 112. The storage area 608 may be arranged in various physical configurations. In one implementation, the storage area 608 may include one or more aisles 612. The aisles 612 may be configured with, or defined by, inventory locations 110 on one or both sides of the aisle 612. The inventory locations 110 may include one or more of shelves, racks, cases, cabinets, bins, floor locations, or other suitable storage mechanisms for holding or storing the items 112. The inventory locations 110 may be affixed to the floor or another portion of the facility's structure, or may be movable such that the arrangements of aisles 612 may be reconfigurable. In some implementations, the inventory locations 110 may be configured to move independently of an outside operator. For example, the inventory locations 110 may comprise a rack with a power source and a motor, operable by a computing device to allow the rack to move from one location within the facility 102 to another.

The user 108, totes 602, or other material handling apparatus may move within the facility 102. For example, the users 108 may move about within the facility 102 to pick or place the items 112 in various inventory locations 110, placing them on the totes 602 for ease of transport. An individual tote 602 is configured to carry or otherwise transport one or more items 112. For example, a tote 602 may include a basket, a cart, a bag, and so forth. In other implementations, other agencies such as robots, forklifts, cranes, aerial drones, and so forth, may move about the facility 102 picking, placing, or otherwise moving the items 112.

One or more sensors 116 may be configured to acquire information in the facility 102. The sensors 116 may include, but are not limited to, imaging sensors 116(1), weight sensors, radio frequency (RF) receivers, temperature sensors, humidity sensors, vibration sensors, and so forth. The sensors 116 may be stationary or mobile, relative to the facility 102. For example, the inventory locations 110 may contain cameras 116(1) configured to acquire images of pick or placement of items 112 on shelves, of the users 108 in the facility 102, and so forth. In another example, the floor of the facility 102 may include weight sensors configured to determine a weight of the users 108 or other object thereupon. The sensors 116 are discussed in more detail below.

During operation of the facility 102, the sensors 116 may be configured to provide information suitable for locating how objects move or other occurrences within the facility 102. For example, a series of images acquired by an imaging sensor 116(1) may indicate removal of an item 112 from a particular inventory location 110 by one of the users 108 and placement of the item 112 on or at least partially within one of the totes 602.

While the storage area 608 is depicted as having one or more aisles 612, inventory locations 110 storing the items 112, sensors 116, and so forth, it is understood that the receiving area 606, the transition area 610, or other areas of the facility 102 may be similarly equipped. Furthermore, the arrangement of the various areas within the facility 102 is depicted functionally rather than schematically. For example, multiple different receiving areas 606, storage areas 608, and transition areas 610 may be interspersed rather than segregated in the facility 102.

The facility 102 may include, or be coupled to, an inventory management system 120, which form a portion of the system described above with reference to FIG. 1. The inventory management system 120 is configured to identify interactions with and between users 108, devices such as sensors 116, robots, material handling equipment, computing devices, and so forth, in one or more of the receiving area 606, the storage area 608, or the transition area 610. These interactions may include one or more events 106. For example, events 106 may include the entry of the user 108 to the facility 102, stocking of items 112 at an inventory location 110, picking of an item 112 from an inventory location 110, returning of an item 112 to an inventory location 110, placement of an item 112 within a tote 602, movement of users 108 relative to one another, gestures by the users 108, and so forth. Other events 106 involving users 108 may include the user 108 providing authentication information in the facility 102, using a computing device at the facility 102 to authenticate identity to the inventory management system 120, and so forth. Some events 106 may involve one or more other objects within the facility 102. For example, the event 106 may comprise movement within the facility 102 of an inventory location 110, such as a counter mounted on wheels. Events 106 may involve one or more of the sensors 116. For example, a change in operation of a sensor 116, such as a sensor failure, change in alignment, and so forth, may be designated as an event 106. Continuing the example, movement of an imaging sensor 116(1) resulting in a change in the orientation of the field of view (such as resulting from someone or something bumping the imaging sensor 116(1)) may be designated as an event 106.

By determining the occurrence of one or more of the events 106, the inventory management system 120 may generate output data 614 (e.g., the event data 124). The output data 614 comprises information (e.g., features) about the event 106. For example, where the event 106 comprises an item 112 being removed from an inventory location 110, the output data 614 may comprise an item identifier indicative of the particular item 112 that was removed from the inventory location 110 and a user identifier of a user 108 that removed the item 112.

The inventory management system 120 may use one or more automated systems to generate the output data 614. For example, an artificial neural network, one or more classifiers, or other automated machine learning techniques may be used to process the sensor data from the one or more sensors 116 to generate output data 614. The automated systems may operate using probabilistic or non-probabilistic techniques. For example, the automated systems may use a Bayesian network. In another example, the automated systems may use support vector machines to generate the output data 614 or the tentative results. The automated systems may generate confidence value data that provides information indicative of the accuracy or confidence that the output data 614 or the tentative data corresponds to the physical world.

The confidence value data may be generated using a variety of techniques, based at least in part on the type of automated system in use. For example, a probabilistic system using a Bayesian network may use a probability assigned to the output as the confidence value. Continuing the example, the Bayesian network may indicate that the probability that the item depicted in the image data corresponds to an item previously stored in memory is 95%. This probability may be used as the confidence value for that item as depicted in the image data.

In another example, output from non-probabilistic techniques such as support vector machines may have confidence values based on a distance in a mathematical space within which the image data of the item and the images of previously stored items have been classified. The greater the distance in this space from a reference point such as the previously stored image to the image data acquired during the occurrence, the lower the confidence value.

In yet another example, the image data of an object such as an item 112, user 108, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence value may be determined based at least in part on these differences. For example, the user 108 may pick an item 112 such as a perfume bottle that is generally cubical in shape from the inventory location 110. Other items 112 at nearby inventory locations 110 may be predominately spherical. Based on the difference in shape (cube vs. sphere) from the adjacent items, and the correspondence in shape with the previously stored image of the perfume bottle item 112 (cubical and cubical), the confidence value that the user 108 has picked up the perfume bottle item 112 is high.

In some situations, the automated techniques may be unable to generate output data 614 with a confidence value above a threshold result. For example, the automated techniques may be unable to distinguish which user 108 in a crowd of users 108 has picked up the item 112 from the inventory location 110. In other situations, it may be desirable to provide human confirmation of the event 106 or of the accuracy of the output data 614. For example, some items 112 may be deemed age restricted such that they are to be handled only by users 108 above a minimum age threshold.

In instances where human confirmation is desired, sensor data associated with an event 106 may be processed to generate inquiry data. The inquiry data may include a subset of the sensor data associated with the event 106. The inquiry data may also include one or more of one or more tentative results as determined by the automated techniques, or supplemental data. The subset of the sensor data may be determined using information about the one or more sensors 116. For example, camera data such as the location of the imaging sensor 116(1) within the facility 102, the orientation of the imaging sensor 116(1), and a field of view of the imaging sensor 116(1) may be used to determine if a particular location within the facility 102 is within the field of view. The subset of the sensor data may include images that may show the inventory location 110 or that the item 112 was stowed. The subset of the sensor data may also omit images from other imaging sensors 116(1) that did not have that inventory location 110 in the field of view. The field of view may comprise a portion of the scene in the facility 102 that the sensor 116 is able to generate sensor data about.

Continuing the example, the subset of the sensor data may comprise a video clip acquired by one or more imaging sensors 116(1) having a field of view that includes the item 112. The tentative results may comprise the "best guess" as to which items 112 may have been involved in the event 106. For example, the tentative results may comprise results determined by the automated system that have a confidence value above a minimum threshold.

Furthermore, when a result of an event record is determined to be below a threshold confidence result, prior to sending the sensor data associated with the event 106 to the human associate, the inventor management system 120 may determine whether the record of the event 106 is to be merged with any other event records. If so, the inventor management system 120 may store an indication of the merged event and may send the user interface comprising inquiry data (e.g., a video clip, etc.) associated with the entire merged event to the computing device of the human associate.

In some instances, the user interface may also include supplemental data, such as the weight of the item 112, bounding boxes or other visual cues to overlay or that have been inserted into the video clip for presentation, and so forth. The inquiry data is provided to a device associated with an associate. For example, the device may comprise a tablet computer, laptop computer, personal computer, set-top box, and so forth. The device presents an associate user interface based at least in part on the inquiry data. Continuing the example, the associate user interface may present the video clip of the item 112 being removed from the inventory location 110. One or more of the tentative results associated with the identity of the item 112 may also be presented in the associate user interface. The associate may view the video clip and the supplemental data and make a selection from the tentative results to identify the item 112 was removed from the inventory location 110. The selection or other information generated by the associate comprises response data. The response data from one or more associates may be processed to generate the output data 614. For example, the majority of the associates may identify the item 112 that was picked from the inventory location 110 as "5 oz box powdered toast". Based at least in part on the majority selection, the inventory management system 120 may generate output data 614 indicating that the item 112 picked was "5 oz box powdered toast".

The facility 102 may be configured to receive different kinds of items 112 from various suppliers and to store them until a customer orders or retrieves one or more of the items 112. Specifically, as illustrated in this example, items 112 may be received from one or more suppliers, such as manufacturers, distributors, wholesalers, and so forth, at the receiving area 606. In various implementations, the items 112 may include merchandise, commodities, perishables, or any suitable type of item 112, depending on the nature of the enterprise that operates the facility 102. The receiving of the items 112 may comprise one or more events 106 for which the inventory management system 120 may generate output data 614.

Upon being received from a supplier at receiving area 606, the items 112 may be prepared for storage. For example, items 112 may be unpacked or otherwise rearranged. The inventory management system 120 may include one or more software applications executing on a computer system to provide inventory management functions based on the events 106 associated with the unpacking or rearrangement. These inventory management functions may include maintaining information indicative of the type, quantity, condition, cost, location, weight, or any other suitable parameters with respect to the items 112. The items 112 may be stocked, managed, or dispensed in terms of countable, individual units or multiples, such as packages, cartons, crates, pallets, or other suitable aggregations. Alternatively, some items 112, such as bulk products, commodities, and so forth, may be stored in continuous or arbitrarily divisible amounts that may not be inherently organized into countable units. Such items 112 may be managed in terms of measurable quantity such as units of length, area, volume, weight, time, duration, or other dimensional properties characterized by units of measurement. Generally speaking, a quantity of an item 112 may refer to either a countable number of individual or aggregate units of an item 112 or a measurable amount of an item 112, as appropriate.

After arriving through the receiving area 606, items 112 may be stored within the storage area 608. In some implementations, like items 112 may be stored or displayed together in the inventory locations 110 such as in bins, on shelves, hanging from pegboards, and so forth. In this implementation, all items 112 of a given kind are stored in one inventory location 110. In other implementations, like items 112 may be stored in different inventory locations 110. For example, to optimize retrieval of certain items 112 having frequent turnover within a large physical facility 102, those items 112 may be stored in several different inventory locations 110 to reduce congestion that might occur at a single inventory location 110. Storage of the items 112 and their respective inventory locations 110 may comprise one or more events 106.

When a customer order specifying one or more items 112 is received, or as a user 108 progresses through the facility 102, the corresponding items 112 may be selected or "picked" from the inventory locations 110 containing those items 112. In various implementations, item picking may range from manual to completely automated picking. For example, in one implementation, a user 108 may have a list of items 112 they desire and may progress through the facility 102 picking items 112 from inventory locations 110 within the storage area 608, and placing those items 112 into a tote 602. In other implementations, employees of the facility 102 may pick items 112 using written or electronic pick lists derived from customer orders. These picked items 112 may be placed into the tote 602 as the employee progresses through the facility 102. Picking may comprise one or more events 106, such as the user 108 in moving to the inventory location 110, retrieval of the item 112 from the inventory location 110, and so forth.

After items 112 have been picked, they may be processed at a transition area 610. The transition area 610 may be any designated area within the facility 102 where items 112 are transitioned from one location to another or from one entity to another. For example, the transition area 610 may be a packing station within the facility 102. When the item 112 arrives at the transition area 610, the items 112 may be transitioned from the storage area 608 to the packing station. The transitioning may comprise one or more events 106. Information about the transition may be maintained by the inventory management system 120 using the output data 614 associated with those events 106.

In another example, if the items 112 are departing the facility 102, a list of the items 112 may be obtained and used by the inventory management system 120 to transition responsibility for, or custody of, the items 112 from the facility 102 to another entity. For example, a carrier may accept the items 112 for transport with that carrier accepting responsibility for the items 112 indicated in the list. In another example, a customer may purchase or rent the items 112 and remove the items 112 from the facility 102. The purchase or rental may comprise one or more events 106.

During use of the facility 102, the user 108 may move about the facility 102 to perform various tasks, such as picking or placing the items 112 in the inventory locations 110. Pluralities of users 108 may move past one another, travel in groups, may coalesce into groups, groups may break apart, and so forth. These movements may comprise one or more events 106. For example, an event 106 may comprise a plurality of users 108 moving past one another in the aisle 612.

The inventory management system 120 may access or generate sensor data about the facility 102 and the contents therein including the items 112, the users 108, the totes 602, and so forth. The sensor data may be acquired by one or more of the sensors 116, data provided by other systems, and so forth. For example, the sensors 116 may include cameras 116(1) configured to acquire image data of scenes in the facility 102. The image data may comprise still images, video, or a combination thereof. The image data may be processed by the inventory management system 120 to determine a location of the user 108, the tote 602, the identity of the user 108, and so forth. As used herein, the identity of the user may represent a unique identifier of the user (e.g., name, number associated with user, username, etc.), an identifier that distinguishes the user amongst other users being tracked with the environment, or the like. The sensors 116 are discussed in more detail below.

The inventory management system 120, or systems coupled thereto, may be configured to identify the user 108, as well as to determine other candidate users. In one implementation, this determination may comprise comparing sensor data with previously stored identity data. For example, the user 108 may be identified by showing their face to a facial recognition system, by presenting a token carrying authentication credentials, providing a fingerprint, scanning a barcode or other type of unique identifier upon entering the facility, and so forth. Identity of the user 108 may be determined before, during, or after entry to the facility 102. Determination of the user's 108 identity may comprise comparing sensor data associated with the user 108 in the facility 102 to previously stored user data.

In some instances, the inventory management system 120 group users 108 within the facility into respective sessions. That is, the inventory management system 120 may utilize the sensor data to determine groups of users 108 that are effectively "together" (e.g., shopping together). In some instances, a particular session may include multiple users 108 that entered the facility 102 together and, potentially, that navigate the facility together. For example, when a family of two adults and two children enter the facility together, the inventory management system may associate each user 108 with a particular session. Locating sessions in addition to individual users 108 may help in determining the outcome of individual events, given that users 108 within a session may not only individually pick or return or otherwise interact with items, but may also pass the items back and forth amongst each other. For instance, a child in the above example may pick the box of cereal before handing the box to her mother, who may place it in her tote 602. Noting the child and the mother as belonging to the same session may increase the probabilities of successfully adding the box of cereal to the virtual shopping cart of the mother.

By determining the occurrence of one or more events 106 and the output data 614 associated therewith, the inventory management system 120 is able to provide one or more services to the users 108 of the facility 102. By utilizing one or more human associates to process inquiry data and generate response data that may then be used to produce output data 614, overall accuracy of the system may be enhanced. The enhanced accuracy may improve the user experience of the one or more users 108 of the facility 102.

The facility 102 may be connected to one or more networks 122, which in turn connect to one or more servers 118. The network(s) 122 may include private networks such as an institutional or personal intranet, public networks such as the Internet, or a combination thereof. The network(s) 122 may utilize wired technologies (e.g., wires, fiber optic cable, and so forth), wireless technologies (e.g., radio frequency, infrared, acoustic, optical, and so forth), or other connection technologies. The network(s) 122 is representative of any type of communication network, including one or more of data networks or voice networks. The network(s) 122 may be implemented using wired infrastructure (e.g., copper cable, fiber optic cable, and so forth), a wireless infrastructure (e.g., cellular, microwave, satellite), or other connection technologies.

The server(s) 118 may be configured to execute one or more modules or software applications associated with the inventory management system 120. While the server(s) 118 are illustrated as being in a location outside of the facility 102, in other implementations, at least a portion of the server(s) 118 may be located at the facility 102. The server(s) 118 are discussed in more detail below with regard to FIG. 7.

The users 108, the totes 602, or other objects in the facility 102 may be equipped with one or more tags, such as radio frequency (RF) tags. The tags may be configured to emit a signal. In one implementation, the tag may be a radio frequency identification (RFID) tag configured to emit a RF signal upon activation by an external signal. For example, the external signal may comprise a radio frequency signal or a magnetic field configured to energize or activate the RFID tag. In another implementation, the tag may comprise a transmitter and a power source configured to power the transmitter. For example, the tag may comprise a Bluetooth Low Energy (BLE) transmitter and battery. In other implementations, the tag may use other techniques to indicate presence. For example, an acoustic tag may be configured to generate an ultrasonic signal which is detected by corresponding acoustic receivers. In yet another implementation, the tag may be configured to emit an optical signal.

The inventory management system 120 may be configured to use the tags for one or more of identification of the object, determining a location of the object, and so forth. For example, the users 108 may wear tags, the totes 602 may have tags affixed, and so forth, which may be read and, based at least in part on signal strength, used to determine identity and location. Generally, the inventory management system 120 or other systems associated with the facility 102 may include any number and combination of input components, output components, and server(s) 118.

The one or more sensors 116 may be arranged at one or more locations within the facility 102. For example, the sensors 116 may be mounted on or within a floor, wall, at a ceiling, at an inventory location 110, on the tote 602, may be carried or worn by the user 108, and so forth. The sensors 116 produce respective sensor data.

The sensors 116 may include one or more imaging sensors 116(1). These imaging sensors 116(1) may include cameras configured to acquire images of a scene. The imaging sensors 116(1) are configured to detect light in one or more wavelengths including, but not limited to, terahertz, infrared, visible, ultraviolet, and so forth. The imaging sensors 116 (1), as well as any image sensors described herein, may provide sensor data in the form of the image data, in the form of indications of what item was picked or return and the location of the item, combinations thereof, and/or the like. The inventory management system 120 may use image data acquired by the imaging sensors 116(1) during operation of the facility 102. For example, the inventory management system 120 may identify items 112, identify users 108, identify totes 602, determine a location, and so forth, based at least in part on their appearance within the image data.

One or more three-dimensional (3D) sensors 116(2) may also be included in the sensors 116. The 3D sensors 116(2) are configured to acquire spatial or 3D data, such as depth information, about objects within a sensor field-of-view. The 3D sensors 116(2) include range cameras, lidar systems, sonar systems, radar systems, structured light systems, stereo vision systems, optical interferometry systems, and so forth. The inventory management system 120 may use the 3D data acquired to identify objects, determine a location of an object, and so forth. For example, the inventory management system 120 may determine operational data such as location in the facility 102 of the user 108 based at least in part on the location in 3D space of the user 108.

One or more buttons 116(3) are configured to accept input from the user 108. The buttons 116(3) may comprise mechanical, capacitive, optical, or other mechanisms. For example, the buttons 116(3) may comprise mechanical switches configured to accept an applied force from a touch of the user 108 to generate an input signal. The inventory management system 120 may use data from the buttons 116(3) to receive information from the user 108 and produce button data.

The sensors 116 may include one or more touch sensors 116(4). The touch sensors 116(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 120 may use data from the touch sensors 116(4) to receive information from the user 108. For example, the touch sensor 116(4) may be integrated with the tote 602 to provide a touchscreen with which the user 108 may select from a menu one or more particular items 112 for picking.

One or more microphones 116(5) may be configured to acquire information indicative of sound present in the environment and generate audio data. In some implementations, arrays of microphones 116(5) may be used. These arrays may implement beamforming techniques to provide for directionality of gain. The inventory management system 120 may use the one or more microphones 116(5) to acquire information from acoustic tags, accept voice input from the users 108, determine the location of one or more users 108 in the facility 102, determine ambient noise level, and so forth.

One or more weight sensors 116(6) are configured to measure the weight of a load, such as the item 112, the user 108, the tote 602, and so forth and generate weight data. The weight sensors 116(6) may be configured to measure the weight of the load at one or more of the inventory locations 110, the tote 602, or on the floor of the facility 102. The weight sensors 116(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The inventory management system 120 may use the data acquired by the weight sensors 116(6) to identify an object, determine a location of an object, maintain shipping records, identify the user 108, and so forth. In addition to the weight data, the weight sensors 116(6) may send an indication of an item picked or returned and a location of the item, an indication of a cost of an item removed, combinations there, and/or the like. Further, each of the sensors 116 may provide this type of data.

The sensors 116 may include one or more light sensors 116(6) configured to generate light sensor data. The light sensors 116(6) may be configured to provide information associated with ambient lighting conditions such as a level of illumination. Information acquired by the light sensors 116(6) may be used by the inventory management system 120 to adjust a level, intensity, or configuration of the user interface.

One more radio frequency identification (RFID) readers 116(8), near field communication (NFC) systems, and so forth, may also be provided in the sensors 116. For example, the RFID readers 116(8) may be configured to read the tags and generate RFID tag data. Information acquired by the RFID reader 116(8) may be used by the inventory management system 120 to identify an object associated with the tag such as the item 112, the user 108, the tote 602, and so forth. For example, based on information from the RFID readers 116(8), a velocity of the tag may be determined.

One or more RF receivers 116(9) may also be provided in the sensors 116 to generate radio-frequency data. In some implementations, the RF receivers 116(9) may be part of transceiver assemblies. The RF receivers 116(9) may be configured to acquire RF signals associated with Wi-Fi™, Bluetooth®, ZigBee®, Z-Wave, 3G, 4G, LTE, or other wireless data transmission technologies. The RF receivers 116(9) may provide information associated with data transmitted via radio frequencies, signal strength of RF signals, and so forth. For example, information from the RF receivers 116(9) may be used by the inventory management system 120 to determine a location of an RF source, such as a communication interface onboard the tote 602 or carried by the user 108.

The sensors 116 may include one or more accelerometers 116(10) that may be worn or carried by the user 108, mounted to the tote 602, and so forth. The accelerometers 116(10) may provide accelerometer data such as the direction and magnitude of an imposed acceleration. Data such as rate of acceleration, determination of changes in direction, speed, and so forth, may be determined using the accelerometers 116(10).

A gyroscope 116(11) provides gyroscope data indicative of rotation of an object affixed thereto. For example, the tote 602, the user 108, or other objects may be equipped with a gyroscope 116(11) to provide data indicative of a change in orientation.

A magnetometer 116(12) may be used to determine an orientation by measuring ambient magnetic fields, such as the terrestrial magnetic field. The magnetometer 116(12) may generate magnetometer data indicative of the direction, strength, and so forth of a magnetic field. The magnetometer 116(12) may be worn or carried by the user 108, mounted to the tote 602, and so forth. For example, the magnetometer 116(12) mounted to the tote 602 may act as a compass and provide information indicative of which way the tote 602 is oriented.

The sensors 116 may include other sensors 116 as well. For example, the other sensors 116 may include proximity sensors, ultrasonic rangefinders, thermometers, barometric sensors, hygrometers, biometric input devices including, but not limited to, fingerprint readers or palm scanners, and so forth. For example, the inventory management system 120 may use information acquired from thermometers and hygrometers in the facility 102 to direct the user 108 to check on delicate items 112 stored in a particular inventory location 110.

The facility 102 may include one or more access points configured to establish one or more wireless networks and the network(s) 122. The access points may use Wi-Fi™ NFC, Bluetooth®, or other technologies to establish wireless communications between a device and the network(s) 122. The wireless networks allow the devices to communicate with one or more of the inventory management system 120, the sensors 116, the tag, a communication device of the tote 602, or other devices.

In some examples, the totes 602 may include one or more sensors 604 to acquire information in the facility 102. The sensors in the facility 102 (e.g., sensors 116) may include sensors fixed in the environment (e.g., ceiling-mounted cameras) or otherwise, such as sensors in the possession of users (e.g., mobile phones, tablets, etc.) or sensors mounted on the totes 602 (e.g., tote sensors 604). The tote sensors 604 may include proximity sensors 604(1) to detect items 112 being placed in the tote 602, inward-facing imaging sensors 604(3) to identify items 112 being placed in the tote 602, communication interfaces, weight sensors 604(4) (e.g., in the bottom of the tote), light sensors 604(2), outward facing sensors 604(3), radio frequency (RF), temperature sensors, humidity sensors, vibration sensors, and so forth. The sensors may be, in some examples, in or on the tote 602 or another location in the facility 102. In one example, the bottom of the totes 602 may include weight sensors configured to determine a weight of the items 112 placed thereupon.

During operation of the facility 102, the sensors may be configured to provide information suitable for identifying the movement of items 112 or other occurrences within the tote 602. For example, a series of images acquired by a camera 604(3) may indicate removal of an item 112 from a particular tote 602 by one of the users 108 and/or placement of the item 112 on or at least partially within one of the totes 602.

The totes 602 may include or be associated with a tote-management system that may access or generate sensor data about the items 112, the users 108, the totes 602, and so forth. The sensor data may be acquired by one or more of the sensors 604, data provided by other systems, and so forth. For example, the sensors may include cameras configured to acquire image data of items 112 placed in the totes 602. The image data may comprise still images, video, or a combination thereof. The image data may be processed by the tote management system to determine an item identifier for the items 112, a listing of items in the tote 602 for a user 108, and so forth. As used herein, the identity of the user of a tote 602 may represent a unique identifier of the user (e.g., name, number associated with user, username, etc.), an identifier that distinguishes the user amongst other users being identified with the environment, or the like.

The tote-management system, or systems coupled thereto, may be configured to identify the user 108. In one implementation, this determination may comprise comparing sensor data with previously stored identity data. For example, the user 108 may be identified by showing their face to a facial recognition system, by presenting a token carrying authentication credentials, providing a fingerprint, scanning a barcode or other type of unique identifier upon entering the facility, and so forth. Identity of the user 108 may be determined before, during, or after entry to the facility 102 and/or interaction with a tote 602. Determination of the user's identity may comprise comparing sensor data associated with the user 108 in the facility 102 and/or with the tote 602 to previously stored user data. In some examples, the output data 614 may be transmitted over the network(s) 122 to the server(s) 118.

Figure 7:
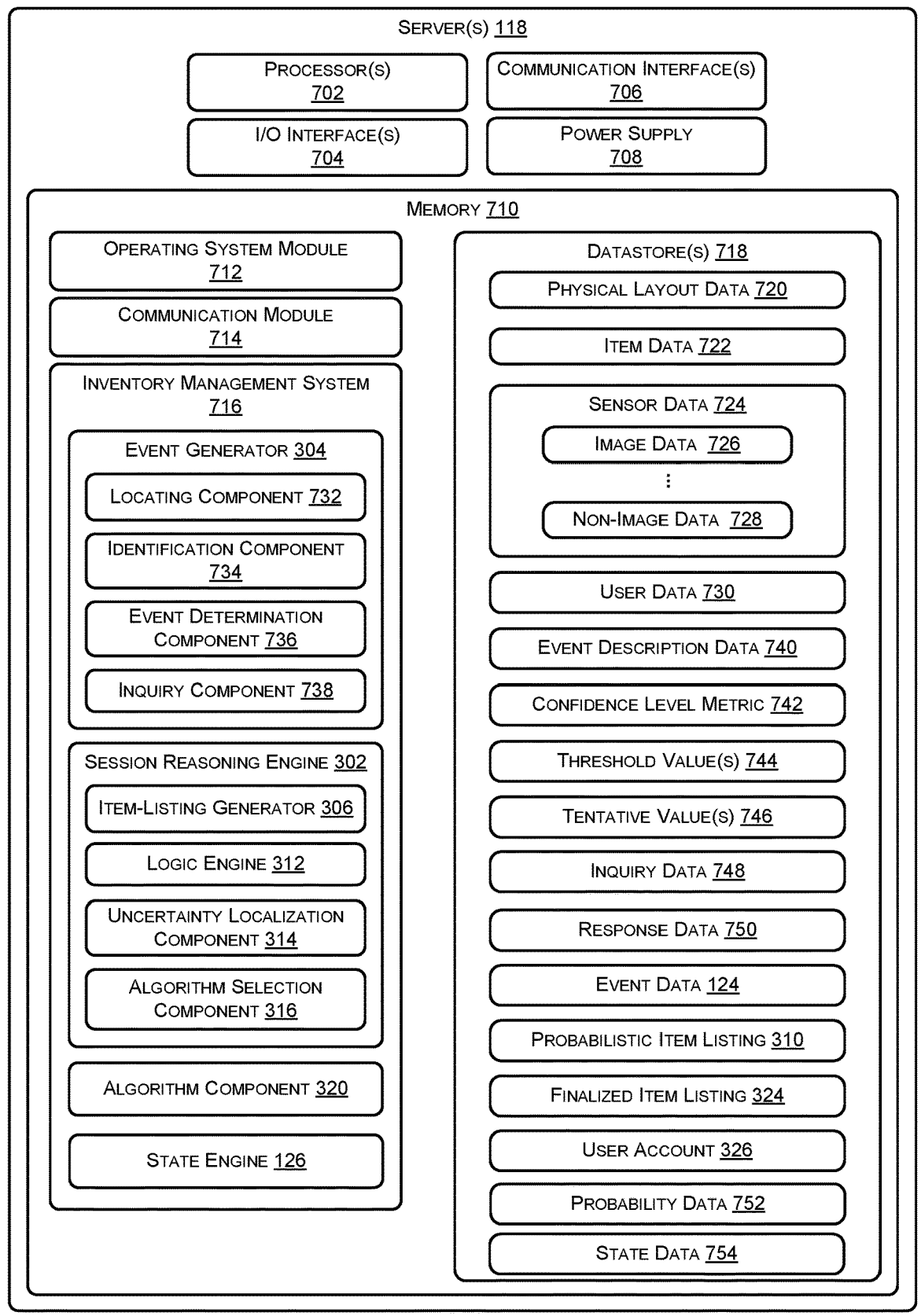
FIG. 7 illustrates a block diagram of one or more servers configured to support operation of the material handling facility. As illustrated, the servers may host an inventory management system configured to use components of a session reasoning engine to determine listings of items taken by users from the facility.

FIG. 7 illustrates a block diagram of one or more server(s) 118 configured to support operation of the facility 102. As illustrated, the server(s) 118 may host an inventory management system 120 configured to use components of a session reasoning engine 700 to determine listings of items 112 taken by users 108 from the facility 102.

The server(s) 118 may be physically present at the facility 102, may be accessible by the network(s) 122, or a combination of both. The server(s) 118 does not require end-user knowledge of the physical location and configuration of the system that delivers the services. Common expressions associated with the server(s) 118 may include "on-demand computing," "software as a service (SaaS)," "platform computing," "network-accessible platform," "cloud services," "data centers," and so forth. Services provided by the server(s) 118 may be distributed across one or more physical or virtual devices.

The server(s) 118 may include one or more hardware processors 702 (processors) configured to execute one or more stored instructions. The processor(s) 702 may comprise one or more cores. The server(s) 118 may include one or more input/output (I/O) interface(s) 704 to allow the processor(s) 702 or other portions of the server(s) 118 to communicate with other devices. The I/O interface(s) 704 may comprise Inter-Integrated Circuit (I2C), Serial Peripheral Interface bus (SPI), Universal Serial Bus (USB) as promulgated by the USB Implementers Forum, RS-282, and so forth.

The I/O interface(s) 704 may couple to one or more I/O devices. The I/O device(s) may include input devices such as the sensors 116, one or more of a keyboard, mouse, scanner, and so forth. The I/O device(s) may also include output devices such as one or more of a display, printer, audio speakers, and so forth. In some embodiments, the I/O device(s) may be physically incorporated with the server(s) 118 or may be externally placed.

The server(s) 118 may also include one or more communication interfaces 706. The communication interface(s) 706 are configured to provide communications between the server(s) 118 and other devices, such as the sensors 116, the interface devices, routers, access points, and so forth. The communication interface(s) 706 may include devices configured to couple to personal area networks (PANs), wired and wireless local area networks (LANs), wired and wireless wide area networks (WANs), and so forth. For example, the communication interface(s) 706 may include devices compatible with Ethernet, Wi-Fi™, and so forth.

The server(s) 118 may also include one or more busses or other internal communications hardware or software that allow for the transfer of data between the various modules and components of the server(s) 118.

As shown in FIG. 7, the server(s) 118 includes one or more memories 710. The memory 710 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 710 provides storage of computer-readable instructions, data structures, program modules, and other data for the operation of the server(s) 118. A few example functional modules are shown stored in the memory 710, although the same functionality may alternatively be implemented in hardware, firmware, or as a system on a chip (SOC).

The memory 710 may include at least one operating system (OS) component 712. The OS component 712 is configured to manage hardware resource devices such as the I/O interface(s) 704, the I/O device(s), the communication interface(s) 706, and provide various services to applications or modules executing on the processor(s) 702. The OS component 712 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following modules may also be stored in the memory 710. These modules may be executed as foreground applications, background tasks, daemons, and so forth.

A communication component 714 may be configured to establish communications with one or more of the sensors 116, one or more of the devices used by associates, other server(s) 118, or other devices. The communications may be authenticated, encrypted, and so forth.

The memory 710 may store an inventory management component 716. The inventory management component 716 is configured to provide the inventory functions as described herein with regard to the inventory management system 120. For example, the inventory management component 716 may track movement of items 112 in the facility 102, generate user interface data, and so forth.

The inventory management component 716 may access information stored in a datastore(s) 718 in the memory 710. The datastore(s) 718 may use a flat file, database, linked list, tree, executable code, script, or other data structure to store the information. In some implementations, the datastore(s) 718 or a portion of the datastore(s) 718 may be distributed across one or more other devices including other server(s) 118, network attached storage devices, and so forth.

The datastore(s) 718 may include physical layout data 720. The physical layout data 720 provides a mapping of physical locations within the physical layout of devices and objects such as the sensors 116, inventory locations 110, and so forth. The physical layout data 720 may indicate the coordinates within the facility 102 of an inventory location 110, sensors 116 within view of that inventory location 110, and so forth. For example, the physical layout data 720 may include camera data comprising one or more of a location within the facility 102 of an imaging sensor 116(1), orientation of the imaging sensor 116(1), the operational status, and so forth. Continuing example, the physical layout data 720 may indicate the coordinates of the imaging sensor 116(1), pan and tilt information indicative of a direction that the field of view is oriented along, whether the imaging sensor 116(1) is operating or malfunctioning, and so forth.

In some implementations, the inventory management component 716 may access the physical layout data 720 to determine if a location associated with the event 106 is within the field of view of one or more sensors 114/116. Continuing the example above, given the location within the facility 102 of the event 106 and the camera data, the inventory management component 716 may determine the imaging sensors 116(1) that may have generated images of the event 106.

The item data 722 comprises information associated with the items 112. The information may include information indicative of one or more inventory locations 110 at which one or more of the items 112 are stored. The item data 722 may also include order data, SKU or other product identifier, price, quantity on hand, weight, expiration date, images of the item 112, detail description information, ratings, ranking, and so forth. The inventory management component 716 may store information associated with inventory management functions in the item data 722.

The datastore(s) 718 may also include sensor data 724 (which may include, and/or be similar to, the sensor data 104). The sensor data 724 comprises information acquired from, or based on, the one or more sensors 116. For example, the sensor data 724 may comprise 8D information about an object in the facility 102. As described above, the sensors 116 may include an imaging sensor 116(1), which is configured to acquire one or more images. These images may be stored as the image data 726. The image data 726 may comprise information descriptive of a plurality of picture elements or pixels. Non-image data 728 may comprise information from other sensors 116, such as input from the microphones 116(5), weight sensors 116(6), and so forth.

User data 730 may also be stored in the datastore(s) 718. The user data 730 may include identity data, information indicative of a profile, purchase history, location data, images of the user 108, demographic data, and so forth. Individual users 108 or groups of users 108 may selectively provide user data 730 for use by the inventory management system 120. The individual users 108 or groups of users 108 may also authorize collection of the user data 730 during use of the facility 102 or access to user data 730 obtained from other systems. For example, the user 108 may opt-in to collection of the user data 730 to receive enhanced services while using the facility 102.

In some implementations, the user data 730 may include information designating a user 108 for special handling. For example, the user data 730 may indicate that a particular user 108 has been associated with an increased number of errors with respect to output data. The inventory management component 716 may be configured to use this information to apply additional scrutiny to the events 106 associated with this user 108. For example, events 106 that include an item 112 having a cost or value above the threshold amount may be provided to the associates for processing regardless of the determined level of confidence in the output data as generated by the automated system.

The inventory management component 716 may include one or more of a locating component 732, identification component 734, event determination component 736, or inquiry component 738. The locating component 732 may be configured to track one or more objects associated with the facility 102. For example, the locating component 732 may access the sensor data 724 to determine location data.

The location data provides information indicative of a location of an object, such as the item 112, the user 108, the tote 602, and so forth. The location may be absolute with respect to the facility 102 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 102, 5.2 m from an inventory location 110 along a heading of 169°, and so forth. For example, the location data may indicate that the user 108 is 25.2 m along the aisle and standing in front of the inventory location 110. In comparison, a relative location may indicate that the user 108 is 82 cm from the tote 602 at a heading of 78° with respect to the tote 602. The location data may include orientation information, such as which direction the user 108 is facing. The orientation may be determined by the relative direction the user's 108 body is facing. In some implementations, the orientation may be relative to the interface device. Continuing the example, the location data may indicate that the user 108 is oriented with a heading of 0°, or looking north. In another example, the location data may indicate that the user 108 is facing towards the interface device.

The identification component 734 is configured to identify an object. In one implementation, the identification component 734 may be configured to identify an item 112. In another implementation, the identification component 734 may be configured to identify the user 108. For example, the identification component 734 may use facial recognition techniques to process the image data 726 and determine the identity data of the user 108 depicted in the images by comparing the characteristics in the image data 726 with previously stored values. The identification component 734 may also access data from other sensors 116, such as from the RFID reader 116(8), the RF receiver 116(9), fingerprint sensors, and so forth.

Facial recognition may include analyzing facial characteristics which are indicative of one or more facial features in an image, 8D data, or both. For example, the face of the user 108 may be detected within one or more of the images of the image data 726. The facial features include measurements of, or comparisons between, facial fiducials or ordinal points. The facial features may include eyes, mouth, lips, nose, chin, ears, face width, skin texture, 8D shape of the face, presence of eyeglasses, and so forth. In some implementations, the facial characteristics may include facial metrics. The facial metrics indicate various ratios of relative sizes and spacing of the facial features. For example, the facial metrics may include a ratio of interpupillary distance to facial width, ratio of eye width to nose width, and so forth. In some implementations, the facial characteristics may comprise a set of eigenvectors by using principal component analysis (PCA) on a set of images. These eigenvectors, as descriptive of a human face, may be known as "eigenfaces" or "eigenimages".

In one implementation, the facial recognition described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In other implementations, other techniques may be used to recognize faces. Previously stored registration data may associate particular facial characteristics with a particular identity, such as represented by a user account. For example, the particular pattern of eigenvectors in the image may be sought in the previously stored data, and matches within a threshold tolerance may be determined to indicate identity of the user 108. The eigenvectors or other measurements may be compared with previously stored characteristics to determine the user data 730 of the person in the image or to distinguish one user 108 from another.

The event determination component 736 is configured to process the sensor data 724 and generate output data. The event determination component 736 may access information stored in the datastore(s) 718 including, but not limited to, event description data 740, confidence level metrics 742, or threshold values 744.

The event description data 740 comprises information indicative of one or more events 106. For example, the event description data 740 may comprise predefined profiles that designate movement of an item 112 from an inventory location 110 with the event 106 of "pick". The event description data 740 may be manually generated or automatically generated. The event description data 740 may include data indicative of triggers associated with events 106 occurring in the facility 102. An event 106 may be determined as occurring upon detection of the trigger. For example, sensor data 724 such as a change in weight from a weight sensor 116(6) at an inventory location 110 may trigger detection of an event of an item 112 being added or removed from the inventory location 110. In another example, the trigger may comprise an image of the user 108 reaching a hand toward the inventory location 110. In yet another example, the trigger may comprise two or more users 108 approaching to within a threshold distance of one another.

The event determination component 736 may process the sensor data 724 using one or more techniques including, but not limited to, artificial neural networks, classifiers, decision trees, support vector machines, Bayesian networks, and so forth. For example, the event determination component 736 may use a decision tree to determine occurrence of the "pick" event 106 based on sensor data 724. The event determination component 736 may further use the sensor data 724 to determine one or more tentative values 746. The one or more tentative values 746 comprise data associated with the event 106. For example, where the event 106 comprises a disambiguation of users 108, the tentative values 746 may comprise a list of possible user 108 identities. In another example, where the event 106 comprises a disambiguation between items 112, the tentative values 746 may comprise a list of possible item identifiers. In some implementations, the tentative value 746 may indicate the possible action. For example, the action may comprise the user 108 picking, placing, moving an item 112, damaging an item 112, providing gestural input, and so forth.

In some implementations, the tentative values 746 may be generated by other components. For example, the tentative values 746 such as one or more possible identities or locations of the user 108 involved in the event 106 may be generated by the locating component 732. In another example, the tentative values 746 such as possible items 112 that may have been involved in the event 106 may be generated by the identification component 734.

The event determination component 736 may be configured to provide a confidence level metric 742 associated with the determination of the tentative values 746. The confidence level metric 742 provides indicia as to the expected level of accuracy of the tentative value 746. For example, a low confidence level metric 742 may indicate that the tentative value 746 has a low probability of corresponding to the actual circumstances of the event 106. In comparison, a high confidence level metric 742 may indicate that the tentative value 746 has a high probability of corresponding to the actual circumstances of the event 106.

In some implementations, the tentative values 746 having confidence level metrics 742 that exceed the threshold value 744 may be deemed to be sufficiently accurate and thus may be used as the output data. For example, the event determination component 736 may provide tentative values 746 indicative of the three possible items 112 corresponding to the "pick" event 106. The confidence level metrics 742 associated with the possible items 112 may be 25%, 70%, 92%, respectively. Continuing the example, the threshold value 744 may be set such that confidence level metrics 742 of 90% are deemed to be sufficiently accurate. As a result, the event determination component 736 may designate the "pick" event 106 as involving item 113 with the highest probability.

In situations where the event determination component 736 determines that the confidence level metric 742 associated with the tentative value 746 is below a threshold value 744, the inquiry component 738 may be utilized. In other situations, such as where verification by human operator is desired, the inquiry component 738 may also be utilized.

The inquiry component 738 may be configured to use at least a portion of the sensor data 724 associated with the event 106 to generate inquiry data 748. In some implementations, the inquiry data 748 may include one or more of the tentative values 746 or supplemental data. The inquiry component 738 may be configured to provide inquiry data 748 to one or more devices associated with one or more human associates.

An associate user interface is presented on the respective devices of associates. The associate may generate response data 750 by selecting a particular tentative value 746, entering new information, indicating that they are unable to answer the inquiry, and so forth.

The inquiry component 738 processes the response data 750 provided by the one or more associates. The processing may include calculating one or more statistical values associated with the response data 750. For example, statistical values may include a count of the number of times associates selected a particular tentative value 746, determination of a percentage of the associates that selected a particular tentative value 746, and so forth.

In some instances, the threshold value(s) 746 may further represent one or more thresholds to use when determining the state of the inventory location 110. Additionally, the datastore(s) 718 may store probability data 752 representing the probabilities associated with the state of the inventory location 110 and state data 754 representing the current state of the inventory location 110. In some instances, the state data 754 further represents the metrics used by the inventory management system 120 to determine the probabilities.

Other components may also be present in the memory 710. For example, an accounting module may be configured to generate information indicative of a cost of goods picked by the user 108. Other data may also be stored in the datastore(s) 718. For example, the other data may comprise the cost of goods picked by the user 108, payment information, and so forth.

The server(s) 118 may also include a power supply 708. The power supply 708 is configured to provide electrical power suitable for operating the components in the server(s) 118.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Figure 8A:
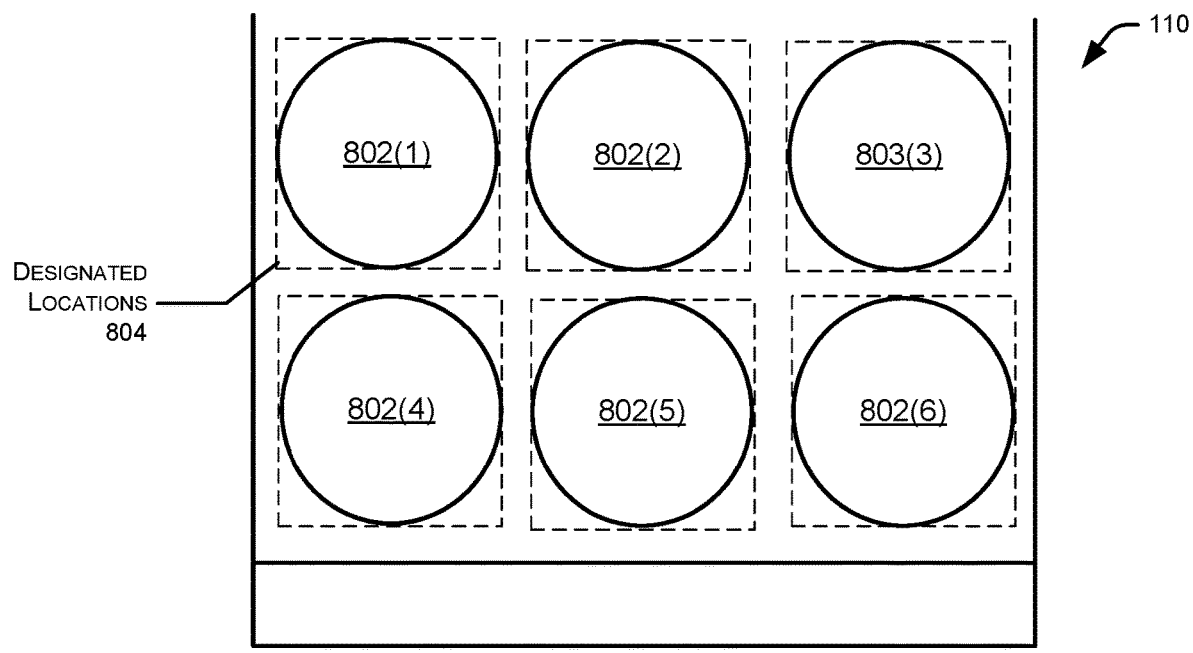
FIGS. 8A-8B illustrate examples of different states that may be associated with an inventory location.
Figure 8B:
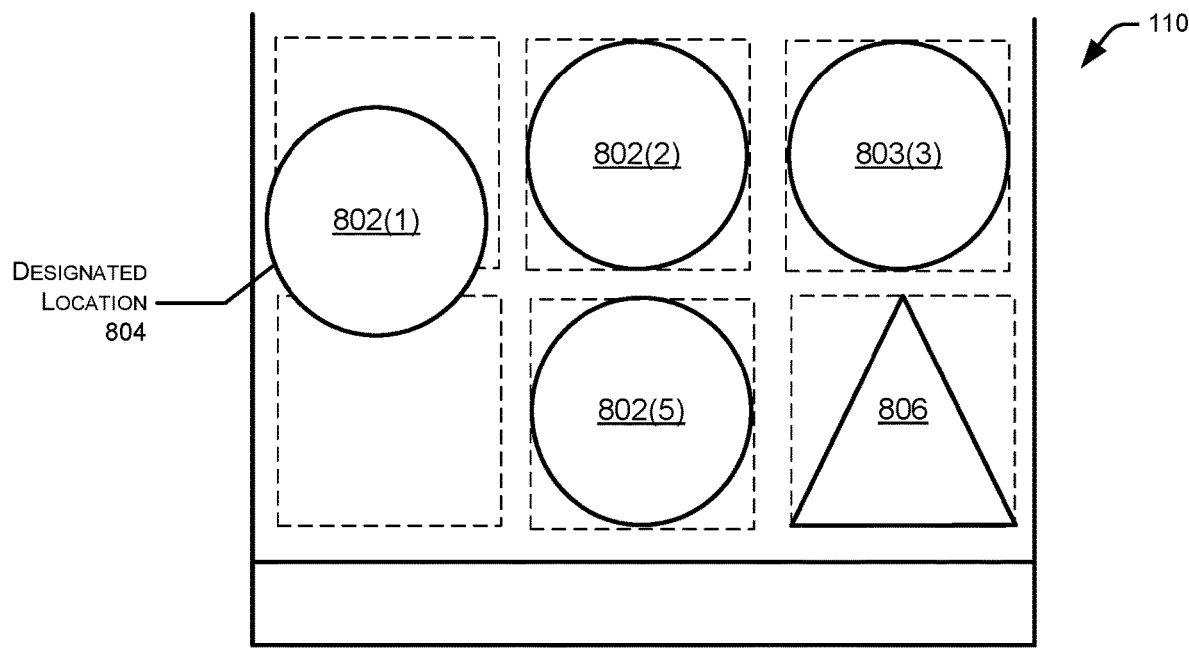

FIGS. 8A-8B illustrate examples of different states that may be associated with the inventory location 110. For instance, in the example of FIG. 8A, the inventory location 110 may be associated with a first type of items, such as circle blocks 802(1)-(6) (also "circle blocks 802"). As shown, the inventory location 110 includes designated locations 804 for the circle blocks 802, although only one is labeled for clarity reasons. In the example of FIG. 8A, the inventory location 110 may be in the first state (e.g., the tidy state) since all of the items include the circle blocks 802 and/or because all of the items are located within designated locations 804.

In the example of FIG. 8B, a first customer may have removed the circle block 804(4) from the inventory location 110, a second customer may have removed the circle block 802(6) from the inventory location 110, a third customer may have moved the circle block 802(1) within the inventory location 110, and a fourth customer may have wrongfully returned a triangle block 806 to the inventory location 110. As such, the inventory location 110 may be in the second state (e.g., the untidy state). In some instances, the inventory location 110 is in the second state since the triangle block 806 is wrongfully located within the inventory location 110. Additionally, or alternatively, the inventory location 110 may be in the second state since the circle block 802(1) is no longer fully located within a designated location 804.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
   one or more sensors configured to generate sensor data;
   one or more processors; and
   one or more non-transitory computer-readable media storing computer-executable instructions that, when executed by the one or more processors, cause the one or more processors to perform operations comprising:
   determining, using a first portion of the sensor data, a first event associated with an inventory location in a facility, the first event indicating that an associate performed a task associated with the inventory location at a first time;
   generating first initial event data for the first event, the first initial event data being associated with the associate performing the task;
   determining, using a second portion of the sensor data, a second event associated with the inventory location, the second event indicating that a first customer removed a first item from the inventory location at a second time;
   determining, based at least in part on the first initial event data, a first tidiness probability associated with the inventory location during the second time;
   determining that the first tidiness probability satisfies a threshold;
   based at least in part on the first tidiness probability satisfying the threshold:
      determining that the inventory location is in a tidy state during the second time, the tidy state indicating each item located at the inventory location is associated with the inventory location; and
      determining that a first confidence level associated with the second event satisfies a threshold confidence;
   generating second initial event data for the second event, the second initial event data being associated with the first customer removing the first item;
   determining, using a third portion of the sensor data, a third event associated with the inventory location, the third event indicating that a second customer removed a second item from the inventory location at a third time or the second customer returned the second item to the inventory location at the third time;
   determining, based at least in part on the first initial event data and the second initial event data, a second tidiness probability associated with the inventory location during the third time;
   determining that the second tidiness probability satisfies the tidy threshold;
   based at least in part on the second tidiness probability satisfying the tidy threshold, determining that the inventory location is in the tidy state during the third time; and
   generating refined event data for the second event, the refined event data indicating that the first customer removed the first item.

2. The system as recited in claim 1, wherein the third event indicates that the second customer returned the second item to the inventory location at the third time, and wherein the operations further comprise:
   generating third initial event data for the third event, the third initial event data associated with the second customer returning the second item;
   determining, using a fourth portion of the sensor data, a fourth event associated with the inventory location, the fourth event indicating that a third customer removed a third item from the inventory location at a fourth time;
   determining, based at least in part on the first initial event data, the second initial event data, and the third initial event data, a third tidiness probability associated with the inventory location during the fourth time;

determining that the third tidiness probability does not satisfy the tidy threshold; and based at least in part on the third tidiness probability not satisfying the tidy threshold:

determining that the inventory location is in an untidy state during the fourth time, the untidy state indicating one or more items located at the inventory location are not associated with the inventory location;

determining that a third confidence level associated with the fourth event does not satisfy the threshold confidence; and determining to further process fourth initial event data associated with the fourth event to determine that the third customer removed the third item from the inventory location at the fourth time.

3. The system as recited in claim 1, the operations further comprising generating a listing of items associated with the first customer, the listing of items including at least the first item based at least in part on the refined event data.

4. A method comprising:

generating first sensor data using one or more sensors associated with an inventory location;

determining, using the first sensor data, a first event associated with a first item located at the inventory location;

generating, at a first time, and based on the first sensor data, first event data having a first confidence level in an accuracy of the first event data;

generating second sensor data using the one or more sensors associated with the inventory location;

determining, using the second sensor data, a second event associated with a second item located at the inventory location, the second event being associated with a user removing the second item from the inventory location at a second time;

determining, based at least in part on the first event data, a first probability that the inventory location is in a first state at the second time;

determining, based at least in part on the first probability, that the inventory location is in the first state at the second time; and generating, at a third time, and based on at least one of the first sensor data or the first event data, second event data having a second confidence level in an accuracy of the second event data, the second confidence level being equal to or greater than the first confidence level.

5. The method as recited in claim 4, further comprising: determining that the first probability satisfies a threshold; and wherein determining that the inventory location is in the first state at the second time is based at least in part on the first probability satisfying the threshold, the first state indicating each item located at the inventory location is associated with the inventory location.

6. The method as recited in claim 4, further comprising: determining that the first probability does not satisfy a threshold, wherein determining that the inventory location is in the first state at the second time of the second event is based at least in part on the first probability not satisfying the threshold, the first state indicating one or more items located at the inventory location are not associated with the inventory location.

7. The method as recited in claim 4, further comprising generating a listing of items, the listing of items including at least the second item based at least in part on the inventory location being in the first state at the second time.

8. The method as recited in claim 4, further comprising: based at least in part on the inventory location being in the first state at the second time further processing the second sensor data; and based at least in part on further processing the second sensor data, adding the second item to a listing of items.

9. The method as recited in claim 4, further comprising: generating third sensor data using the one or more sensors associated with the inventory location;

determining, using the third sensor data, a third event associated with a third item located at the inventory location; and generating third event data associated with the third event, wherein determining the first probability that the inventory location is in the first state at the second time is further based at least in part on the third event data.

10. The method as recited in claim 4, further comprising: generating third sensor data using the one or more sensors associated with the inventory location;

determining, using the third sensor data, a third event associated with a third item located at the inventory location;

generating third event data associated with the third event; and determining, based at least in part on the third event data, a second probability that the inventory location is in the first state, wherein determining the first probability that the inventory location is in the first state at the second time is further based at least in part on at least one of the second probability or the third event data.

11. The method as recited in claim 10, further comprising determining, based at least in part on the second probability, that the inventory location is in a second state at a fourth time, the second state being different than the first state.

12. The method as recited in claim 4, further comprising: storing metrics data representing at least a value associated with a feature, the value representing a likelihood that events that include the feature cause inventory locations to at least one of remain in the first state or switch to a second state;

determining that the first event data indicates the first event is associated with the feature; and determining the value based at least in part on the first event data indicating that the first event is associated with the feature, wherein determining the first probability that the inventory location is in the first state at the second time is based at least in part on the value.

13. The method as recited in claim 4, further comprising: storing metrics data representing at least a value associated with a type of event, the value representing a likelihood that the type of event causes inventory locations to at least one of remain in the first state or switch to a second state;

determining that the first event data indicates the first event is associated with the type of event; and determining the value based at least in part on the first event data indicating that the first event is associated with the type of event, wherein determining the first probability that the inventory location is in the first state at the second time is based at least in part on the value.

14. The method as recited in claim 4, wherein generating the first event data associated with the first event comprises generating the first event data to represent at least one of:

the first event includes a removing of the first item from the inventory location;

the first event includes a returning of the first item to the inventory location;

the first event includes a removing of a quantity of the first item from the inventory location;

the first event includes an associate performing a task associated with the inventory location;

an identity of the first item;

an identity of an additional user associated with the first event; or a time of the first event.

15. One or more computing devices comprising:

one or more processors; and one or more non-transitory computer-readable media storing instructions that, when executed by the one or more processors, cause the one or more processors to perform operations comprising:

generating first event data representing one or more first events that occur with one or more first items at an inventory location;

receiving first sensor data generated by one or more sensors located at the inventory location;

determining, using the first sensor data, a second event associated with a second item located at the inventory location, the second event being associated with a user removing the second item from the inventory location;

determining, based at least in part on at least a portion of the first event data, a first tidiness probability associated with the inventory location;

determining that the inventory location is in a tidy state at a time of the second event based at least in part on the first tidiness probability; and generating a first listing of items, the listing of items including the second item.

16. The one or more computing devices as recited in claim 15, the operations further comprising:

determining that the first tidiness probability satisfies a threshold, wherein determining that the inventory location is in the tidy state at the time of the second event is based at least in part on the first tidiness probability satisfying the threshold.

17. The one or more computing devices as recited in claim 15, the operations further comprising:

determining to use at least second event data representing a first event from the one or more first events for determining the first probability associated with the inventory location at the time of the second event, wherein the at least the portion of the first event data includes the second event data.

18. The one or more computing devices as recited in claim 15, the operations further comprising:

generating second event data representing the second event, wherein determining the first tidiness probability associated with the inventory location is further based at least in part on the second event data.

19. The one or more computing devices as recited in claim 15, the operations further comprising:

generating second event data representing the second event;

receiving second sensor data generated by the one or more sensors located at the inventory location;

determining, using the second sensor data, a third event associated with a third item located at the inventory location;

determining, based at least in part on at least a portion of the first event data and the second event data, a second tidiness probability associated with the inventory location;

determining that the inventory location is in an untidy state at an additional time of the third event based at least in part on the second tidiness probability; and determining to perform additional processing before adding the third item to an additional listing of items.

20. The one or more computing devices as recited in claim 15, the operations further comprising:

storing metrics data representing at least a value associated with a feature, the value representing a likelihood that events that include the feature cause inventory locations to at least one of remain in the tidy state or switch to an untidy state;

determining that the portion of the first event data indicates a first event from the one or more first events is associated with the feature; and determining the value based at least in part on the portion of the first event data indicating that the first event is associated with the feature, wherein determining the first tidiness probability associated with the inventory location is based at least in part on the value.

21. A system comprising:

one or more processors; and one or more computer-readable media storing instructions that, when executed by the one or more processors, cause the one or more processors to perform operations comprising:

receiving first sensor data generated by one or more first sensors associated with an inventory location;

determining, based at least in part on the first sensor data, that the inventory location is in a first state at a first time;

receiving second sensor data generated by the one or more sensors;

determining that the second sensor data represents an associate performing a task associated with the inventory location; and based at least in part on the associate performing the task, determining that the inventory location is in a second state at a second time.

* * * * *